United States Patent [19]

Boehlke et al.

[11] Patent Number: 5,742,715
[45] Date of Patent: Apr. 21, 1998

[54] OPTICAL FIBER STATUS ANALYZER AND RELATED METHODS

[75] Inventors: Bruce B. Boehlke, Cheyenne, Wyo.; Bruce Vaiden Darden, Lawrenceville, Ga.; Stephen Clement Mettler, Decatur, Ga.; George Edwin Mock, Duluth, Ga.

[73] Assignee: Lucent Technologies Inc., Murray Hill, N.J.

[21] Appl. No.: 576,662

[22] Filed: Dec. 21, 1995

[51] Int. Cl.$^6$ .............. G02B 6/26; G01N 21/00; G01J 1/04
[52] U.S. Cl. .............. 385/32; 385/48; 356/73.1; 250/227.15; 250/227.16
[58] Field of Search .............. 385/12, 13, 32, 385/48; 356/73.1; 250/227, 227.15, 227.16, 227.17, 227.19

[56] References Cited

U.S. PATENT DOCUMENTS

| | | | |
|---|---|---|---|
| 3,931,518 | 1/1976 | Miller | 250/227 |
| 4,671,653 | 6/1987 | So et al. | 356/73.1 |
| 4,672,198 | 6/1987 | Presby | 356/73.1 X |
| 4,749,249 | 6/1988 | Abserson, Jr. et al. | 385/26 |
| 4,887,879 | 12/1989 | Prucnal et al. | 385/48 |
| 5,067,786 | 11/1991 | Hawkins et al. | 385/13 |
| 5,189,298 | 2/1993 | Lieber | 385/48 X |
| 5,483,610 | 1/1996 | Cox | 385/48 |
| 5,519,795 | 5/1996 | Bender et al. | 385/32 |
| 5,537,500 | 7/1996 | Yokoyama | 385/31 |

FOREIGN PATENT DOCUMENTS 60-244908  12/1985  Japan .................... 385/32

*Primary Examiner*—Akm E. Ullah
*Assistant Examiner*—Hemang Sanghavi

[57] ABSTRACT

The apparatus of this invention includes a macrobend/microbend unit which imposes first and second macrobends, and microbends between the first and second macrobends, on an optical fiber under analysis. If light is travelling in one direction on the optical fiber, the bending of the optical fiber is such that some light will escape from the core of the optical fiber at the first macrobend. A first photodetector is arranged to receive light emitted from the first macrobend, and generates a signal indicative of whether light is present at the first macrobend. If light is travelling in the optical fiber in the other direction, the second macrobend causes some light to be emitted. A second photodetector arranged to receive light from the second macrobend, generates a signal indicative of whether light is present at the second macrobend. The apparatus includes a display, generated based on the signals from the photodetectors, indicating the optical fiber status including information such as whether light is travelling in the optical fiber in one direction or the other, whether the optical fiber is live or dead, and/or whether the light emitted from the optical fiber includes a tone signal of fixed frequency. For example, the apparatus can be used to aid a repair technician in quickly determining the optical fibers in need of repair in a damaged optical fiber cable containing many optical fibers. The invention also includes a related method.

25 Claims, 16 Drawing Sheets

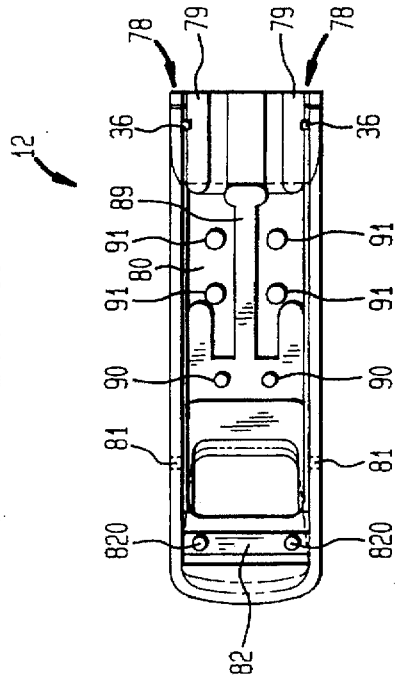
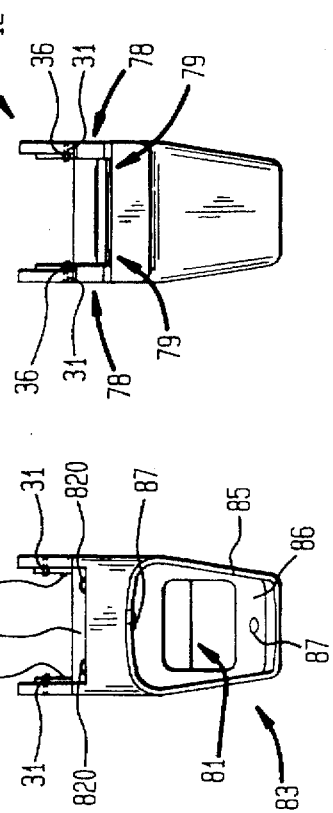
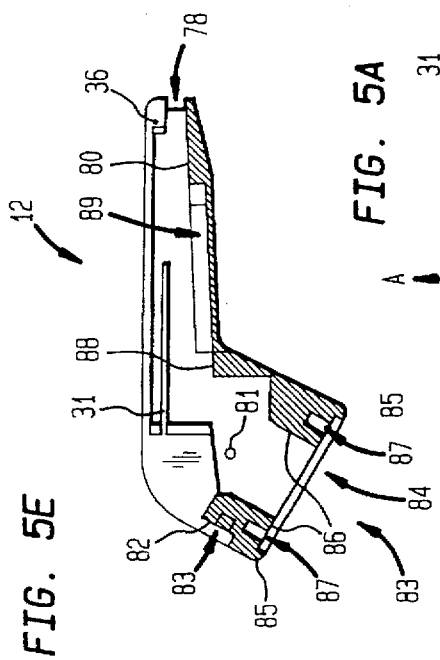
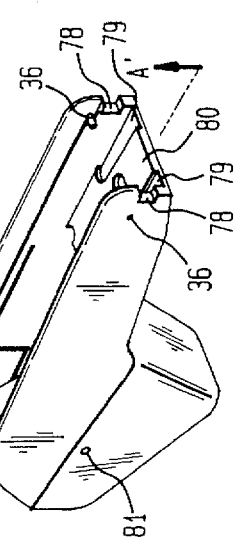
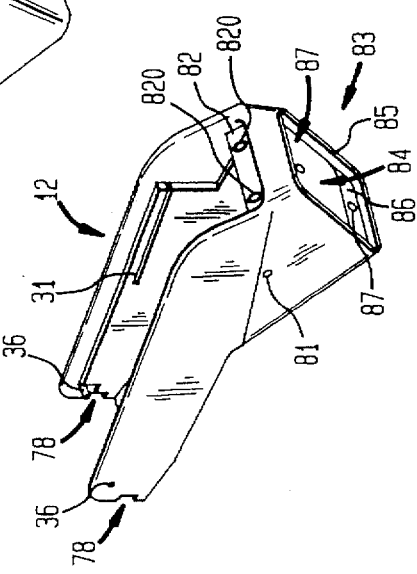

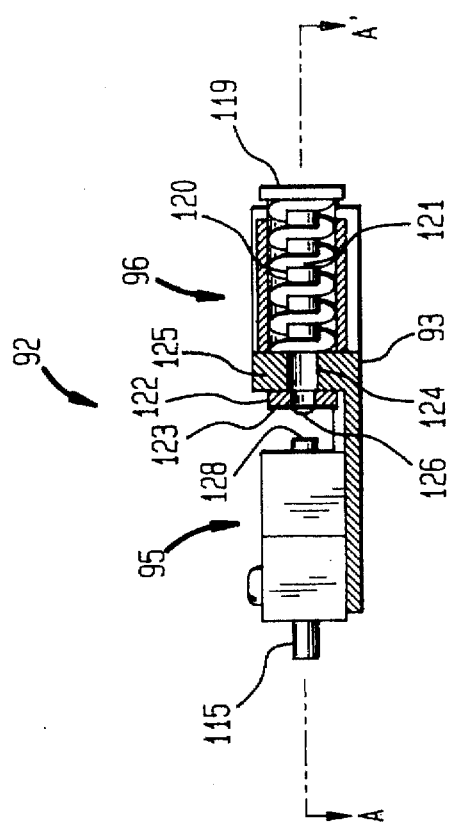
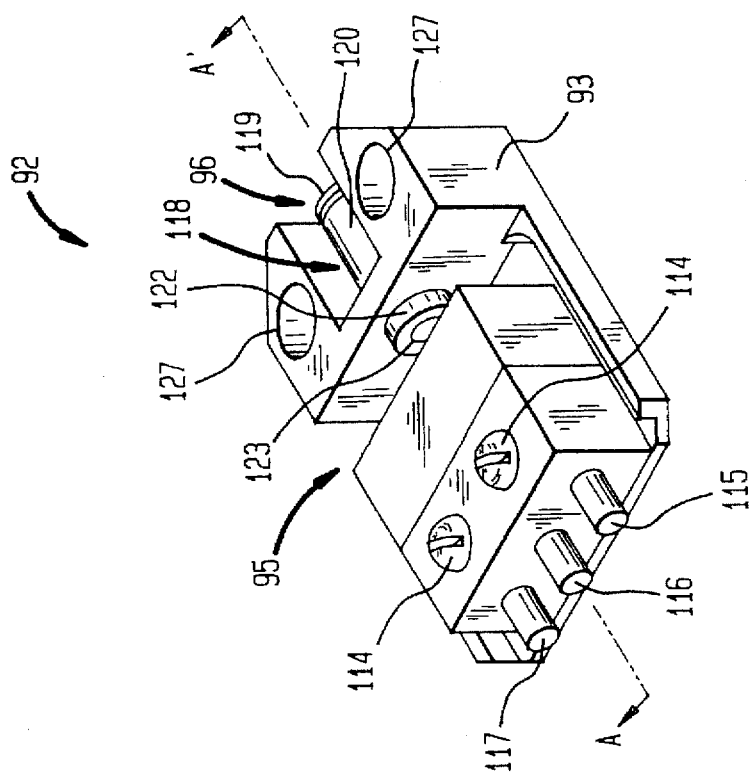
FIG. 8B
FIG. 8A

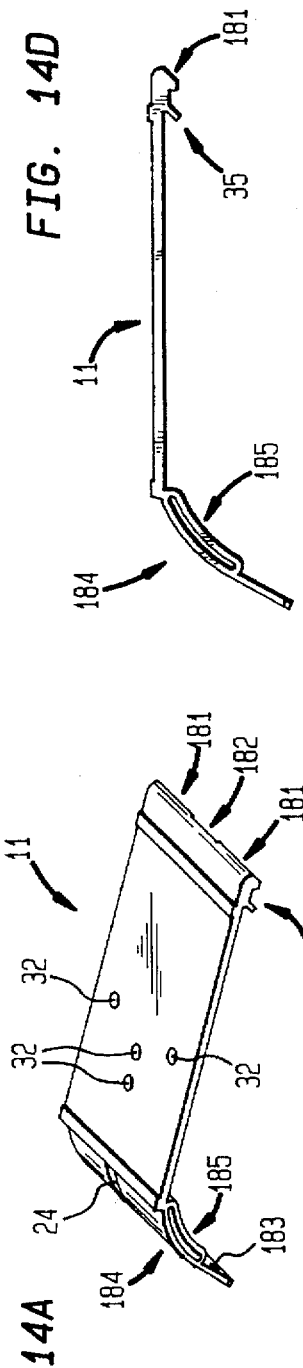
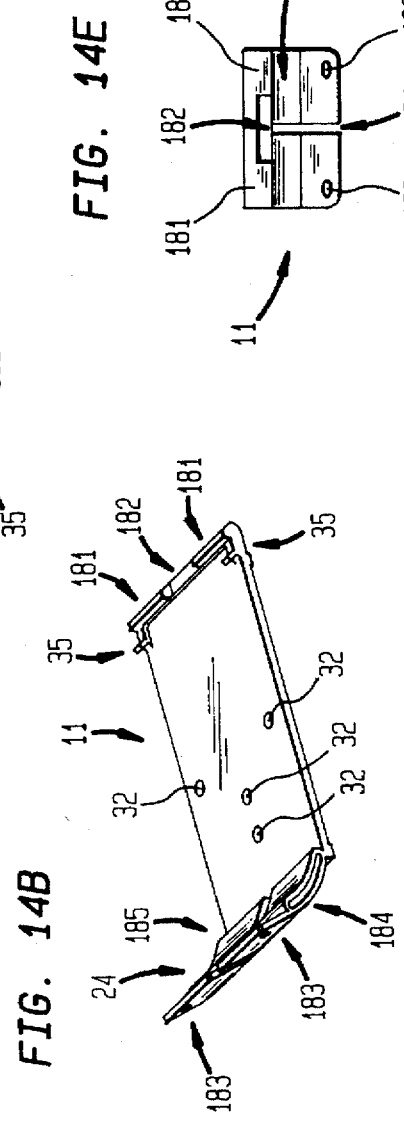
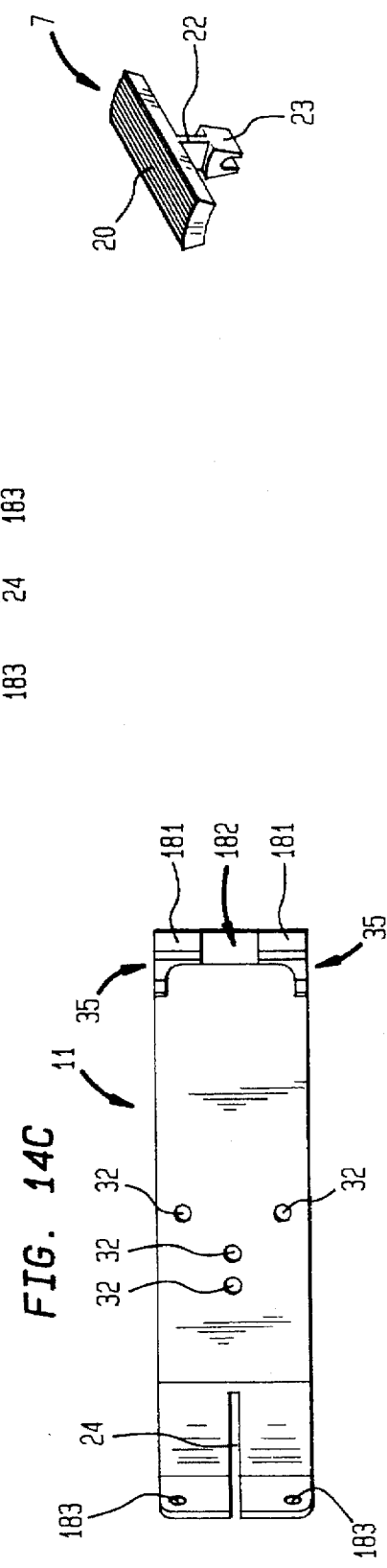

OPTICAL FIBER STATUS ANALYZER AND RELATED METHODS

BACKGROUND OF THE INVENTION

1. Field of the Invention

This invention is directed to an apparatus and method for determining at a test position along the length of an optical fiber the direction of travel of light on the optical fiber. The apparatus and method of this invention also determine whether the optical fiber is 'live', that is, presently transmitting light at the test position, or conversely, whether the optical fiber is 'dead' and thus not transmitting light at the test position. The apparatus and method of this invention can also determine the presence or absence of a 'tone' optical signal of fixed frequency. With these capabilities, the apparatus and method of this invention aid in the repair of damaged optical fiber cable by providing a technician with the ability to quickly determine which of the many optical fibers in a cable have been damaged. Once the damaged optical fibers are determined, the technician can splice around the damaged portion of the optical fiber cable to restore light signal transmission on the fiber.

2. Description of the Related Art

In the telecommunications industry, optical fiber cables are used to transmit light signals from one location to another. Occasionally, optical fibers housed in an optical fiber cable are damaged due to storms, rodent burrowing, shifting earth or by accidents during excavation or otherwise. In telecommunications systems, the amount of optical signal traffic typically carried by an optical fiber can generate thousands of dollars per second in income for an operating company. Thus, when an optical fiber is damaged, the operating company has a compelling need to repair the damaged fiber as soon as possible. For this purpose, central offices usually have equipment which can locate the position of damaged optical fiber cable. Once the position of the damaged optical fiber cable is determined by this equipment, a repair technician goes to the site of the damage and cuts open the optical fiber cable. In the usual case, unless the loose end of a broken optical fiber is visible, the repair technician has no way of knowing which of the several optical fibers in the cable have been damaged. Thus, the technician must determine the damaged optical fiber(s) from among the several optical fibers housed in the typical optical fiber cable, and this must be done without disturbing the traffic carried on the fibers. After the damaged optical fibers are determined, the technician splices around the damaged areas of the optical fibers to restore communications on the optical fibers.

One device used to determine whether an optical fiber is live or dead is made by Biccotest™, Ltd. of England. The device imposes two macrobends on an optical fiber to be tested. Due to the bending, if light is present on the optical fiber, the angle of incidence of the light in the core upon the core/cladding interface where the fiber is bent is such that some light passes through the cladding where it can be detected by photoelectric sensors arranged in proximity to respective macrobends. If the light is detected, the Biccotest™ device indicates with a light-emitting diode (LED) that the optical fiber is live. On the other hand, if the device detects no light, the device imposes a microbend on the optical fiber between the two macrobends. The microbend is basically a series of relatively small or closely spaced bends imposed on the optical fiber, as explained in U.S. Pat. No. 4,749,248 issued Jun. 7, 1988 to Aberson, Jr. et al. and U.S. Pat. No. 3,931,518 issued Jan. 6, 1976 to Miller, the texts of which are incorporated herein by reference as if set forth in full hereinbelow. With the two macrobends and the microbend imposed on the optical fiber, the Biccotest™ device determines whether any light is received by either of the two photoelectric sensors. If light is received, the Biccotest™ device indicates that the optical fiber is live. On the other hand, if the Biccotest™ device detects no light with its photoelectric sensors, the Biccotest™ device indicates that the optical fiber is dead. The Biccotest™ device is used by a technician to repair damaged optical fiber cable by cutting open the optical fiber cable on two sides of a damaged section of the optical fiber cable. In most cases, the damaged section of an optical fiber cable will be apparent to the technician upon inspecting the cable. On one side of the damaged section, a technician compiles a list with the identity of each optical fiber which is usually determined by its color coding scheme, and, associated with the optical fiber identity, an indication of whether the optical fiber is live or dead. Then, for the second side of the damaged section of optical fiber cable, the Biccotest™ device is used to test each optical fiber to determine whether it is live or dead. The optical fiber status on the second side of the damaged area is written by the technician in the list in association with the optical fiber identities. The technician can determine whether a particular optical fiber is damaged or functioning by comparing the optical fiber status on opposite sides of the damaged area of the optic fiber cable. If an optical fiber is live on one side of the damaged portion of the optical fiber cable, but is dead on the other side of the optical fiber cable, the optical fiber is damaged so that the technician must splice around the damaged portion of the optical fiber to restore communications thereon. On the other hand, if the optical fiber is live on both sides of the damaged area of the optical fiber cable, the optical fiber is undamaged. If the optical fiber is dead on both sides of the damaged area of the optical fiber cable, the optical fiber is either damaged in a location outside of the two test locations of the optical fiber cables or there is no light being guided in the optical fiber. With the Biccotest™ device, the repair technician must test each optical fiber on both sides of the damaged area of the optical fiber cable. Therefore, if the optical fiber cable has 56 optical fibers, for example, the repair technician will have to perform 112 tests (56 tests on each side of the damaged area of the optical fiber cable) to compile the above described list. Clearly, this is a tremendous burden to the technician, and it would be desirable to reduce the total number of such tests which must be carried out on the optical fibers of the damaged cable to determine those for which splicing is needed.

In addition to this disadvantage, the Biccotest™ device is bulky and heavy, and requires the technician generally to use both hands to hold the device, a feature which makes difficult the operation of inserting an optical fiber into the device for testing. Moreover, the Biccotest™ device has a broad, blunt nose over which an optical fiber must be moved to position the optical fiber in a slot in the device for testing. Thus, the technician must hold the heavy Biccotest™ device with one hand while plucking a particular fiber from among many, and pull this fiber over the blunt nose of the device without breaking the optical fiber, a considerably difficult operation. Thus, optical fiber cable repair technicians would benefit significantly from a device which eliminates the above-described disadvantages.

SUMMARY OF THE INVENTION

The apparatus and method of this invention overcome the disadvantages described above. The apparatus of this invention includes a macrobend/microbend unit for imposing first and second macrobends on the optical fiber, and for imposing a microbend on the optical fiber between the first and second macrobends. In proximity to the first macrobend, a first photodetector is arranged. The first photodetector generates a signal indicative of whether light is present at the first macrobend. The curvature of the first macrobend and the bending imposed by the microbend is such that light travelling in a first direction in the optical fiber through the microbend to the first macrobend will escape to a degree from the core of the fiber for detection by the first photodetector. However, light propagating in the optical fiber in a second direction opposite to the first direction will not appreciably escape from the core of the optical fiber at the first macrobend. The second macrobend is configured in a converse sense to the first macrobend so that light travelling in the second direction through the microbend to the second macrobend, escapes to a degree from the core of the optical fiber in proximity to the second macrobend. On the other hand, light travelling through the second macrobend in the first direction does not appreciably escape the core of the optical fiber at the second macrobend. To detect the presence of light travelling in the optical fiber in the second direction, a second photodetector is arranged in proximity to the second macrobend. The second photodetector generates a signal indicative of the presence of light at the second macrobend, and thus also indicative of whether light is propagating in the optical fiber in the second direction.

A display is coupled to the first and second photodetectors and indicates to an operator whether light is travelling in the optical fiber in the first and/or second direction. Because the optical fiber is live if light is propagating in either the first or second directions in the optical fiber, the operator of the apparatus of this invention can readily determine whether an optical fiber is live. Moreover, if the display indicates that no light is travelling in either the first or second direction on the optical fiber, the optical fiber is dead. In addition, on a live optical fiber, the apparatus of this invention can be equipped with circuitry for analyzing the signals from the first and second photodetectors to determine and indicate with the display whether a 'tone' signal of fixed frequency is present.

The apparatus of this invention can include a housing for supporting and protecting the macrobend/microbend unit, the first and second photodetectors and the display. The display can be mounted on an upper side of the housing so that an operator of the apparatus can readily view the display. The apparatus of this invention can also include a grip attached to the housing, to provide a handhold for the operator so that the apparatus has a pistol-like configuration which can be operated with only one hand. In addition, the grip can be substantially hollow and define a rack or racks to hold one or more circuit boards with circuitry for driving the display based on the signals from the first and second photodetectors. Moreover, to preserve battery power and to protect the macrobend/microbend unit, the apparatus can include an actuator assembly and switch which define three modes of operation for the apparatus. In the first mode, first and second bend-imposing members of the macrobend/microbend unit are separated to allow insertion or release of an optical fiber from a position between the first and second bend-imposing members and the switch is closed so that no battery power is consumed in the apparatus. In the second mode of operation, the actuator assembly causes the first and second bend-imposing members to engage the optical fiber from opposite sides to impose the first and second macrobends and the microbend on the optical fiber. Also, in the second mode of operation, the actuator assembly causes the switch to close to provide battery power to the first and second photodetectors and the circuitry driving the display, for indicating to an operator the optical fiber status including whether the fiber is live or dead and, if live, the direction of light travelling on the optical fiber and/or the presence of the tone signal. In the third mode of operation, the actuator assembly is positioned to cause the first and second bend-imposing members to be relatively close together and the switch to be open so that no battery power is supplied to the first and second photodetectors and the circuitry driving the display. The third mode of operation is thus advantageous in preserving battery power and protecting the first and second bend-imposing members when not in use. The actuator assembly can include an actuator movable with the thumb of an operator, which slides along a curved surface of the housing and which has three positions defining the respective modes of operation. Preferably, the actuator assembly is biased so that, in the absence of force applied by the operator's thumb, the actuator is in the third position. Moreover, the housing can define a slot in proximity to the macrobend/microbend unit which guides an optical fiber into or out of the macrobend/microbend unit. In addition, the housing can include a nose with a tapered tip which the operator can use to separate a selected optical fiber from the many other optical fibers included in a typical optical fiber cable. The housing can also include a nose with a light shield for shielding the macrobend/microbend unit so that ambient light does not interfere with determination of the optical fiber status.

The method of this invention includes steps of imposing a macrobend and a microbend on an optical fiber, determining if light is being emitted from the first macrobend and generating a first signal based thereon, and generating a display indicating that light is propagating in the optical fiber in a first direction, based on the first signal. Also, in the method of this invention, the above steps can be applied to the optical fiber at a location downstream relative to the first direction from a damaged portion of the optical fiber cable including a plurality of optical fibers, and the method can include a step of determining that the optical fiber is not damaged at a damaged portion of the optical fiber cable if the display indicates that light is propagating in the first direction. The method of this invention can thus be used to simplify repair of an optical fiber cable by greatly reducing the number of tests that must be performed to determine which optical fibers in the cable are damaged, and which are not.

These together with other objects and advantages, which will become subsequently apparent, reside in the details of construction and operation as more fully hereinafter described and claimed, reference being had to the accompanying drawings, forming a part hereof, wherein like numerals refer to like parts throughout the several views.

BRIEF DESCRIPTION OF THE DRAWINGS

The present invention can be better understood with reference to the following drawings. The drawings are not necessarily to scale, emphasis instead being placed upon clearly illustrating the principles of the invention.

FIG. 5A–5F are a cross-sectional view, two different perspective views, top, front and rear views, respectively, of a housing block of the apparatus;

FIGS. 8A and 8B are perspective and cross-sectional side views, respectively, of the spring and switch assembly of the apparatus;

FIGS. 14A–14E are upperside and underside perspective views, and bottom side and rear views, respectively, of a housing cover for the apparatus;

FIG. 15 is a perspective view of an actuator of the actuator assembly;

DESCRIPTION OF THE PREFERRED EMBODIMENTS

Figure 1:
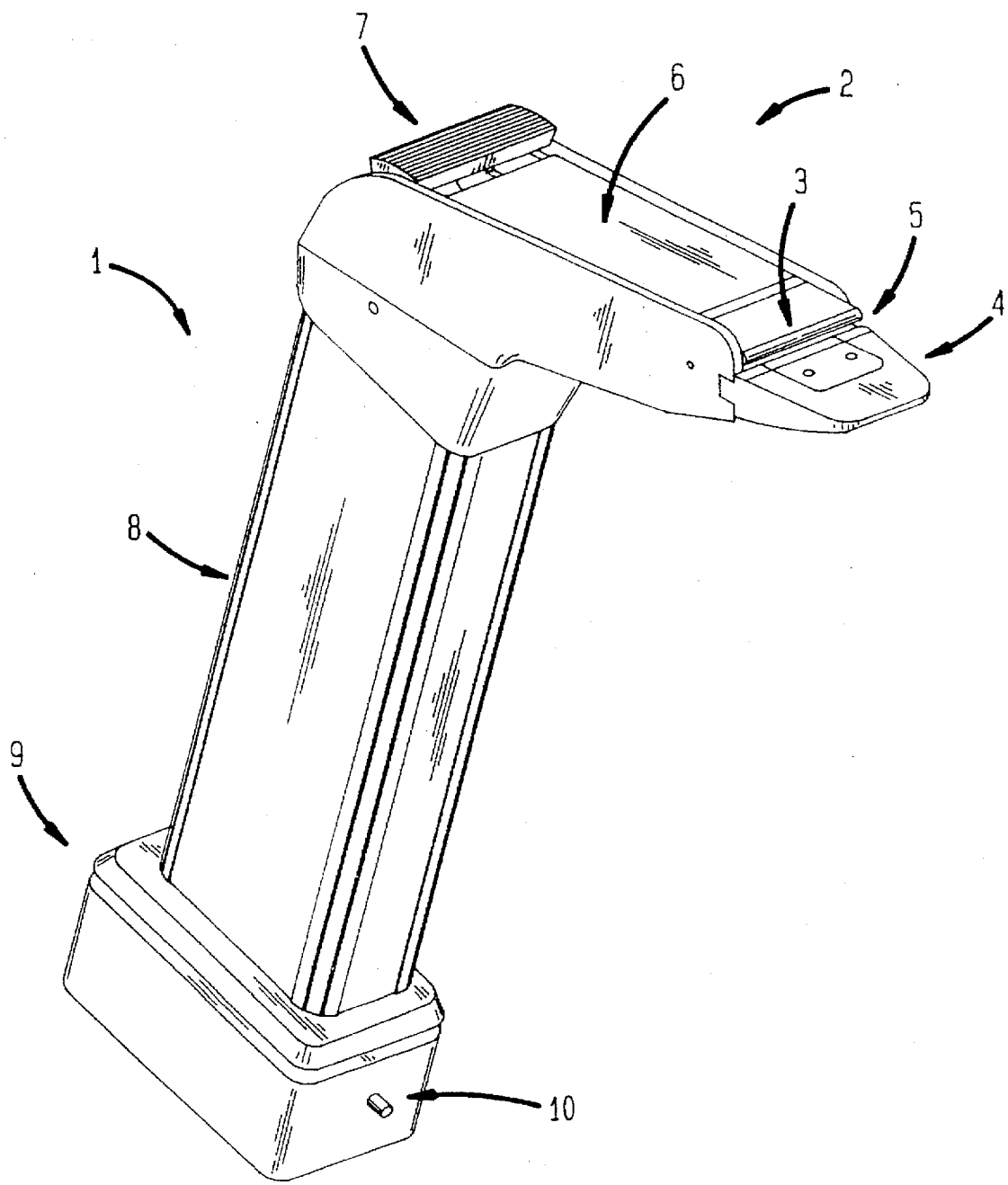
FIG. 1 is a perspective view of a first embodiment of an optical fiber status analyzer apparatus in accordance with this invention.

In FIG. 1, a first embodiment of the optical fiber status analyzer 1 (hereinafter, 'apparatus') is shown. At its upper portion in FIG. 1, the apparatus 1 has a housing 2. The housing 2 substantially encloses and protects a macrobend/microbend unit 3 as well as an actuator assembly used to control the macrobend/microbend unit 3, a pair of photodetectors arranged to receive light from the macrobend/microbend unit 3 and a spring and switch assembly (the actuator assembly, photodetectors and a spring and switch assembly are not shown in FIG. 1). The macrobend/microbend unit 3 is used to determine the status of an optical fiber (not shown in FIG. 1). The optical fiber status includes information such as whether the optical fiber is live or dead, the direction of light propagation on the optical fiber and/or the presence or absence of a tone on the optical fiber. The macrobend/microbend unit 3 is situated adjacent nose 4 which can be manipulated by an operator to separate a selected optical fiber from several optical fibers, and to guide an optical fiber to slot 5. The surfaces of the housing 2 defining the slot 5 aid in guiding an optical fiber to or from the macrobend/microbend unit 3 to load an optical fiber into, or release the optical fiber from, the apparatus 1.

The housing 2 supports a display 6 which indicates to an operator the status of an optical fiber under analysis, including an indication of the direction, either right or left relative to a perspective facing the rear of the apparatus 1, of light travelling on the optical fiber. Because the optical fiber is live if light is travelling in either direction thereon, and is dead otherwise, the display 6 also indicates whether the optical fiber is live or dead. The display 6 can include other indications such as the presence or absence of a tone signal of fixed frequency in the light propagating on the optical fiber, whether or not the apparatus 1 has sufficient battery power to perform status analysis of an optical fiber, and whether or not the display 6 and its associated circuitry are properly operating.

To operate the macrobend/microbend unit 3 and to provide power to the apparatus 1 selectively when performing optical fiber analysis or when testing the display 6, the apparatus 1 includes an actuator 7 which is thumb-operated. The actuator 7 and its operation will be discussed in more detail later in this document in conjunction with the actuator assembly of which the actuator 7 is a part. To provide a handhold for an operator, the apparatus 1 has a grip 8 attached at one end to the housing 2. The grip 8 preferably is substantially hollow and contains racks to hold circuit boards used to drive the display 6. At the other end of the grip 8 is attached a battery case 9 which holds the battery used to drive the circuitry as well as the display 6. Mounted to the battery case 9 is a display test button 10 which, together with the actuator 7, can be used by an operator to determine whether the display 6 is properly functioning.

Figure 2:
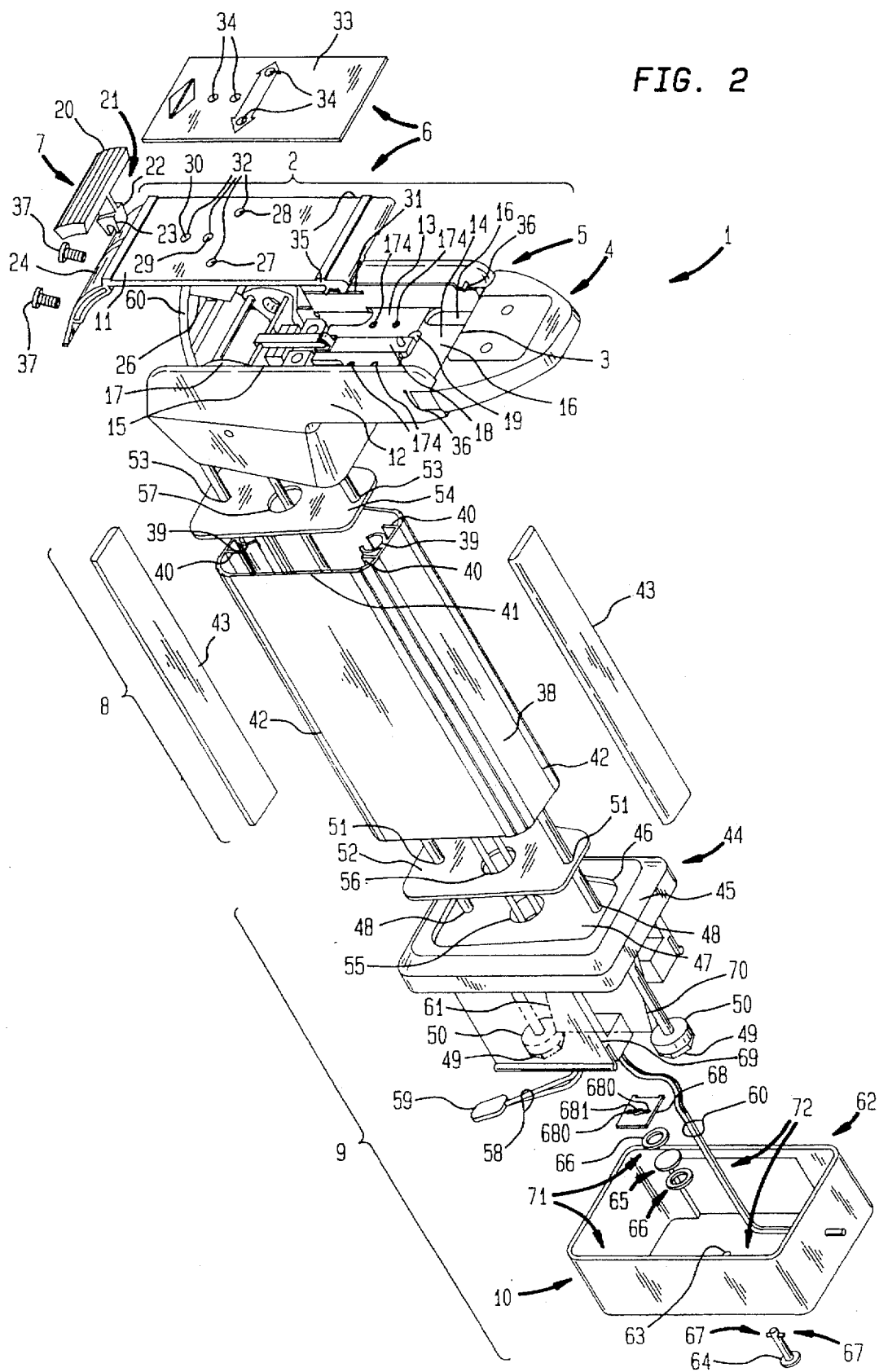
FIG. 2 is an exploded perspective view of the apparatus of FIG. 1.

FIG. 2 is an exploded perspective view of the apparatus 1 of FIG. 1. In FIG. 2, a housing cover 11 is detached from the upper side of the housing block 12 to substantially reveal the macrobend/microbend unit 3, a base 13, a carrier 14 mounted to the base 13, and a portion of an actuator assembly 15. The base 13 and the carrier 14 are considered parts of the housing 2. The base 13 retains a portion of the actuator assembly 15 and supports the carrier 14. The carrier 14 has two collars 16, one on each side thereof, which hold respective photodetectors (not shown in FIG. 2) in a position to receive light from respective macrobends of the macrobend/microbend unit 3. The actuator assembly 15 includes the actuator 7, actuator arm assembly 17, elongated links 18, 19 and other components which are not shown in FIG. 2. The actuator 7 includes a knurled member 20 and on its underside has an extension 21 with a thin portion 22 terminated by a claw 23. The thin portion 22 of the actuator 7 slides in a slot 24 defined in the housing cover 11, and is retained in the slot 24 by the relatively wide knurled member 20 and the claw 23. The claw 23 engages with the actuator arm assembly 17 when the cover 11 is joined with the housing block 12. The actuator arm assembly 17 is rotatably mounted in the housing block 12. One end of the link 18 is rotatably coupled to the actuator arm assembly 17, and one end of the link 19 is rotatably coupled to the other end of the link 18. The link 19 is slidably retained between the base 13 and the housing block 12. At its end opposite the link 18, the link 19 is coupled by components not shown in FIG. 2, to the macrobend/microbend unit 3. Thus, the operator of the apparatus 1 can control the macrobend/microbend unit 3 appropriately for a desired mode of operation via the actuator assembly 15 by appropriately controlling the position of the actuator 7. The details of the actuation of the macrobend/ microbend unit 3 will be discussed later in this document.

In FIG. 2, the display 6 includes a light-emitting diode (LED) circuit board 26 in which are mounted an array of four LEDs 27-30. The sides of LED circuit board 26 are slid from the rear of the housing block 12 into opposing grooves 31 defined on respective inner sides of the housing block 12 for retention therein. The LEDs 27-30 are aligned with respective apertures 32 defined in the housing cover 11 when the cover 11 is joined with the housing block 12. The display 6 also includes a label 33 in which are defined apertures 34 positioned in correspondence with the LEDs 27-30. The label 33 is mounted to the cover 11 to indicate the significance of the illumination, or absence of illumination, of the LEDs 27-30.

In typical operation of the apparatus 1, an operator holds the grip 8 in pistol-like fashion so that the front end of the apparatus 1 (i.e., the end at which the nose 4 is situated) faces away from the operator and so that the rear end of the apparatus 1 (i.e., the end of the housing block 2 at which the actuator 7 is disposed) is nearer to the operator than the apparatus' front end. The operator thus typically views the display 6 from a perspective facing the rear end of the apparatus 1 and from an elevation higher than the surface of the display 6. From the perspective of the operator, the LED 27 is on the right side of the apparatus 1 and the LED 28 is on the left side of the apparatus. For example, if the LED 27 on the right side of the housing cover 11 relative to a perspective facing the rear of the apparatus 1 illuminates, the arrow pointing to the right on the label 33 indicates that light is propagating toward the right on the optical fiber under analysis relative to the operator's viewing perspective. On the other hand, if the LED 28 on the left side of the cover 11 relative to the rear of the apparatus 1 illuminates, the direction of the arrow on the label 33 associated with the LED 28 indicates that light is travelling toward the left on the optical fiber under analysis. If neither of the LEDs 27, 28 are illuminated, the optical fiber under analysis is dead. In addition, information on the label 33 associated with the LED 29 indicates the presence of a tone signal on the optical fiber if the LED 29 is illuminated, and conversely, indicates no tone signal is present on the optical fiber if the LED 29 is not illuminated. Information on the label 33 is associated with the LED 30 to indicate that illumination (blinking light is considered "illumination") of the LED 30 signifies that the apparatus 1 has battery power, or, if the LED 30 is not illuminated, signifies that the apparatus 1 has low battery power so that the apparatus' battery should be inserted or replaced. Further, the label 33 can include information such as arrows indicating that the actuator 7 should be pushed forward toward the nose 4 by the operator to capture or release an optical fiber, and that the actuator 7 should be pulled back toward the rear of the apparatus 1 to perform status analysis of a captured optical fiber.

To join the cover 11 to the block 12, the cover 11 has two opposing hooks 35 arranged toward the front end of the cover 11. The hooks 35 engage with respective pins 36 disposed on opposing inner sides of the housing block 12. The front end of the cover 11 is secured to the housing block 12 by hooking the hooks 35 over the pins 36. In preparation for securing the rear of the cover 11 to the housing block 12, the thin portion 22 of the actuator 7 is slid into the slot 24 and the cover 11 is rotated about the pins 36 while positioning the actuator 7 so that the claw 23 properly engages with the actuator arm assembly 17. With the cover 11 in contact with and enclosing the upper side of the block 12, screws 37 are inserted into respective apertures on opposing sides of the slot 24 and screwed into respective threaded apertures formed in the block 12.

In FIG. 2, the grip 8 includes a member 38 which is substantially hollow and preferably made of a relatively strong, light-weight material such as aluminum or durable plastic. Inside of the member 38 on opposing minor sides, the member 38 has two bolt holders 39 extending along the length of the member 38. Fins 40 are disposed on the inner minor sides of the member 38 adjacent to and on both sides of the holders 39. Like the two bolt holders 39, the fins 40 extend along the length of the member 38. Between opposing holders 39 and fins 40, the side edges of two circuit boards 41 (only one of which is shown in FIG. 2) can be retained. The bolt holders 39 and the fins 40 thus together define racks to house the circuit boards 41. The circuit boards 41 have optical fiber status determination circuitry, and power and display test circuitry which will be explained in more detail with respect to FIG. 16A. On its outer minor sides, the member 38 has a series of parallel ridges 42 formed integrally with the member 38, which aid an operator in gripping the apparatus 1. Also disposed on the outer minor sides of the member 38 are strips 43. The strips 43 are formed of a high-friction material such as rubber, and are adhered or otherwise mounted to the member 38 to further aid the operator in grasping the apparatus 1.

The battery case 9 is attached to the end of the grip 8 opposite the housing 2. The battery case 9 includes a first part 44 having an end member 45 with a continuous edge 46 defining a recessed area 47. The end member 45 also has apertures 48 defined therein. To hold the battery case 9, the grip 8 and the housing 2 together, the apparatus 1 includes two bolts 49. The bolts 49 are inserted through respective washers 50 and respective apertures 48 of the end member 45. The bolts 49 are further inserted through apertures 51 defined in a gasket 52. The gasket 52 is preferably made of neoprene, and is sized to fit, and seated, in the recessed area 47 of the end member 45, and contacts the end of the member 38 to form a seal to prevent moisture from reaching the circuit board(s) 41. The bolts 49 are further inserted through the bolt holders 39 of the grip member 38 and further through apertures 53 defined in a gasket 54. The gasket 54 is similar to the gasket 52, and serves to seal the opposite end of the member 38 so that moisture is prevented from reaching the circuit board(s) 41. The threaded ends of the bolts 49 are screwed into respective threaded apertures (not shown in FIG. 2) defined in the block 12 to hold the housing 2, the grip 8 and the first part 44 of the battery case 9 together.

Because electrical connections are needed between the circuit board(s) 41 housed in the grip 8, and the housing 2 and battery case 9, the end member 45 and the gaskets 52, 54 have respective apertures 55, 56, 57 defined therein. The apertures 55, 56 allow passage of conductive wires 58 between the circuit board(s) 41 and a battery terminal 59. The apertures 55, 56 also allow passage of conductive wires 60 which electrically connect the display test button 10 to the circuit board(s) 41 housed in the grip 8. The aperture 57 in the gasket 54 allows passage of conductive wires 60 which electrically connect the display circuit board 26 to the circuit board(s) 41 housed in the grip 8. The aperture 57 of the gasket 54 also allows passage of conductive wires (not shown in FIG. 2) coupling the photodetectors and the circuit board(s) 41.

The first part 44 has attached to the underside of the end member 45, a battery holder 61 in which can be inserted a battery (not shown) which is preferably a U.S. standard 9 volt battery. The battery can be electrically connected to power the circuit board(s) 41, the photodetectors and the display circuit board 26 by plugging the battery into the battery terminal 59. The battery case 9 also includes a second part 62 configured as an open-topped enclosure, in which the battery holder 61 is housed when the first and second parts 44, 62 are joined together. The second part 62 also houses the display test button 10.

To join the first and second parts 44, 62 together, the second part 62 has an aperture 63 defined therein, through which is inserted a screw 64. The screw 64 is captured, that is, cannot be removed from the second part 62, by the screw's head on the outer side of the second part 62, and on the inner side of the second part 62 by a capture disk 65 secured to the shaft of the screw 64 by capture rings 66 disposed on opposite sides of the capture disk 65. The screw 64 has at the end opposite its head, two extensions 67 which protrude on opposite sides of the screw shaft. A screw end holder 68 is attached to the battery holder 61 and, when the first and second parts 44, 62 are joined together, receives and holds the extensions 67 when the screw 64 is turned one-quarter of a revolution about its shaft, for example, to hold the first and second parts 44, 62 together.

When the screw 64 is turned to uncouple the second part 62 from the first part 44, the battery case 9 has features to prevent the second part 62 from falling away from the apparatus 1. Specifically, the first part 44 has opposing flanges 69 (only one of which can be seen in FIG. 2) which have outwardly protruding edges 70. The flanges 69 are flexible to a degree so that when squeezed toward one another, the edges 70 can be moved past ledges 71 disposed on opposing inner surfaces of the second part 62. When the edges 70 are inserted into the second part 62 and released, the flanges 69 return to their unflexed positions so that the edges 70 are constrained in respective tracks 72 by the ledges 71. The tracks 72 are recessed areas defined in the second part 62 adjacent to respective ledges 71. The tracks 72 are disposed on the inner major side surfaces of the second part 62 and extend from respective ledges 71 to the bottom inner surface of the second part 62 so that the edges 70 will not be obstructed from moving in respective tracks 72 to the bottom inner surface of the second part 62 when the first and second parts 44, 62 are pushed entirely together. Also, if the second part 62 is removed from the first part 44 by squeezing the flanges 69 together and pulling apart the first and second parts 44, 62, the wires 60 coupled between the display test button 10 and the circuit board 41 prevent the second part 62 from falling away from the apparatus 1.

Figure 3A:
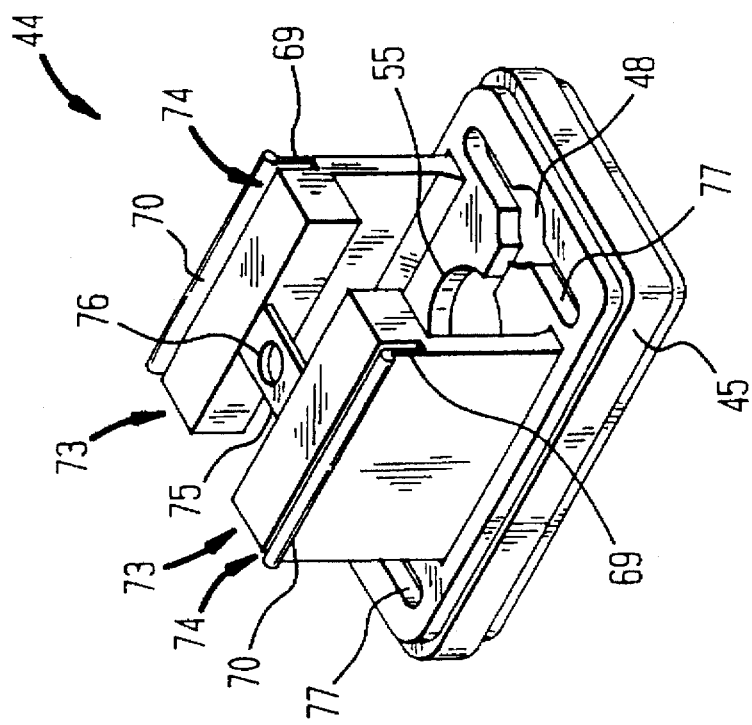
FIGS. 3A and 3B are different perspective views a first part of the battery case of the apparatus.

FIG. 3A is a perspective view of the first part 44 of the battery case 9. Most of the features of the first part 44 have been previously described with respect to FIG. 2. However, FIG. 3A is provided in this document for an appreciation of the preferred features of the first part 44 in three-dimensions. Worth noting with respect to FIG. 3A is that the battery holder 61 preferably includes two opposing members 73, approximately L-shaped in cross-section, between which a battery can be inserted. Also, the flanges 69 are defined and permitted to flex inwardly toward one another by the presence of respective gaps 74 defined in the members 73.

Figure 3B:
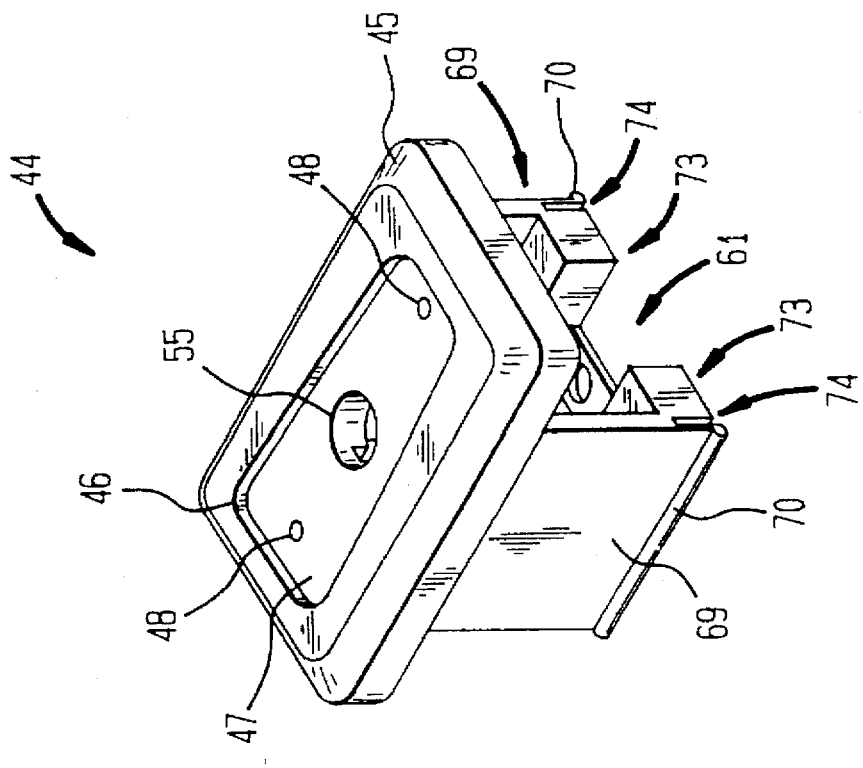

FIG. 3B is a perspective view of the first part 44 turned upside down relative to FIG. 3A. As is evident in FIG. 3B, the members 73 are connected by a bridge 75 defining an aperture 76. The bridge 75 receives and holds the screw end holder 68 shown in FIG. 2. More specifically, when viewed from its side, the screw end holder 68 is substantially S-shaped, and from its top to bottom sides, has three aligned apertures extending through the three overlapping portions of the S-shaped holder 68. The lower part of the S-shaped holder 68 is clipped onto the bridge 75 so that the apertures of the S-shaped holder 68 are aligned with the aperture 76 of the bridge 75. The diameter of the aperture in the top portion of the S-shaped holder is more narrow than the other two openings of the holder 68, but has slots 680 on opposing sides (see FIG. 2) to allow the extensions 67 of the screw 64 to be inserted into the top portion of holder 68, and locked therein by a quarter-turn of the screw 64. Preferably, the top portion of the holder 68 also has stops 681 that engage with the extensions 67 of the screw 64 to prevent the screw 64 from being rotated more than one-quarter of a turn.

As best seen in FIG. 3B, the first part 44 also has wire receptacles 77 which are recessed areas defined in the underside of the end member 45 into which the wires 58, 60 can be folded when joining the first part 44 to the second part 62.

Figure 4B:
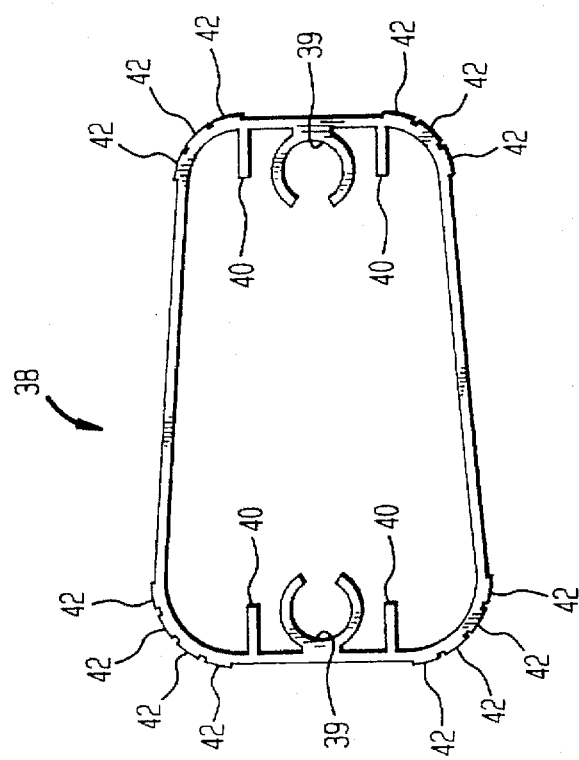
FIGS. 4A and 4B are a perspective view and a cross-sectional view of a grip of the apparatus.
Figure 4A:
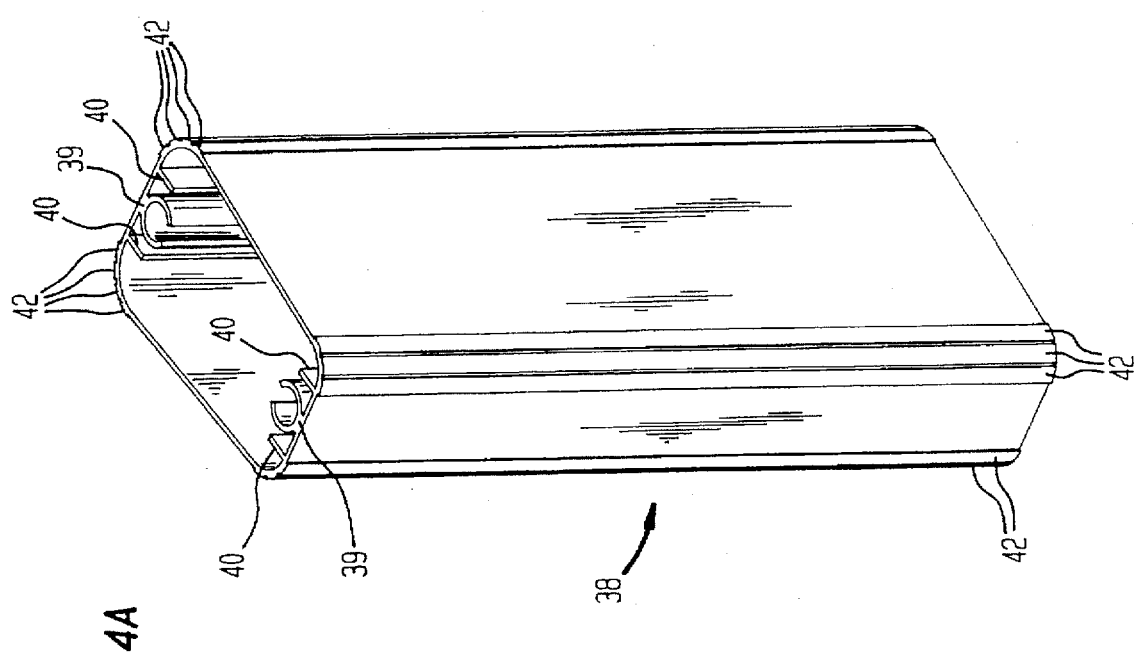

FIGS. 4A and 4B are a perspective view and a cross-sectional view, respectively, of the member 38 of the grip 8. Most of the significant features of the member 38 have been explained with respect to FIG. 2, and FIGS. 4A and 4B are provided for appreciation of the preferred three-dimensional configuration of the member 38. Noteworthy with respect to FIGS. 4A and 4B is that the bolt holders 39 are preferably C-shaped in cross-section rather than being tube-like. The C-shaped configuration of the bolt holders 39 results in a configuration which can be readily mass-produced by extrusion from molten material such as aluminum or suitable plastic, and cutting the extruded material into sizes appropriate for the grip members 38 of several apparatuses 1.

FIGS. 5A–5F are various views of the housing block 12. In FIG. 5A, toward the front end of the housing block 12, notches 78 and tracks 79 are defined. The notches 78 are defined on opposing major surfaces of the block 12, and the tracks 79 are recessed areas defined on the inner bottom surface of the block 12 adjacent respective inner side surfaces of the block 12. The notches 78 and the tracks 79 receive and hold respective portions of an assembly including the nose 4 which will be described in detail later in this document with respect to FIGS. 9A and 9B. The front end of the block 12 also includes a platform 80 positioned on the inner bottom surface of the block 12. The platform 80 defines the inner sides of the tracks 79. Also, the platform 80 supports the base 13 (see FIG. 2). Toward the front end of the block 12, the block 12 includes pins 36 extending from respective inner side surfaces of the block 12. As previously explained, the pins 36 can be engaged with the hooks 35 of the cover 11 to hold the front end of the cover 11 on the block 12. Also, FIG. 5A shows one of the opposing grooves 31 defined in the sides of the block 12. The grooves 31 are open toward the rear of the block 12 so that the side edges of the LED circuit board 26 can be slid to the proper position for alignment with the apertures 32 of the cover 11. FIG. 5A also shows one of the apertures 81 defined on opposing sides of the block 12 toward its rear. The apertures 81 receive and hold an axle 99 (see, e.g., FIG. 6B) which holds the actuator arm assembly 17 (see, e.g., FIG. 2) in the block 12 and serves as a rotation pivot axis therefor.

In FIG. 5B, additional features of the block 12 are shown. Specifically, toward the rear of the block 12, a ledge 82 is disposed. The ledge 82 has defined therein two threaded apertures 820 which receive and hold the ends of respective screws 37 (see, e.g., FIG. 2) to hold the rear of the cover 11 (see, e.g., FIG. 2) to the block 12.

An end portion 83 of the block 12 receives and holds an end of the grip 8 (see, e.g., FIG. 2). The end portion 83 of the block 12 defines an opening 84 which communicates with the hollow area inside of the block 12. Through the opening 84, wires 60 (see FIG. 2) coupled between the circuit board(s) 41 and the LED display circuit board 26 as well as wires running between photodetectors situated in the housing 2 and the circuit board(s) 41, can be passed. In proximity to the opening 84, a collar 85 has inner side surfaces which are sized to fit over the outer surfaces of the end of the grip 8 to hold the grip 8 stably when the housing 2 and the grip 8 are assembled together. Inside of the periphery of the collar 85, mounting surface 86 serves as a stop against which the end of the grip 8 rests when inserted into the collar 85 for assembly. In the mounting surface 86, two threaded apertures 87 are defined. The threaded apertures 87 receive respective threaded ends of the bolts 49 to hold the grip 8 to the housing 2.

FIGS. 5C and 5D are front and rear views, respectively, of the block 12. The significant features of the block 12 that can be seen in FIGS. 5C and 5D have previously been described, but FIGS. 5C and 5D are to provide a better understanding of the three-dimensional configuration of the block 12.

FIG. 5E is a cross-sectional projection view of the block 12 taken along the section A–A' in FIG. 5A. In other words, FIG. 5E is a view of the block 12 as seen if the block 12 were cut in half along the line A–A' and viewed from the side. FIG. 5E shows some features of the block 12 which are not apparent from the previous views of the block 12. Specifically, on its inner bottom surface, the block 12 has a seat 88 which serves to support a spring and switch assembly to be described later in this document with respect to FIGS. 6A, 6B and 8A, 8B. The platform 80 disposed on the inner bottom surface of the block 12 defines a track 89 along which the link 19 (see FIG. 2) slides when the actuator 7 is moved between positions. In FIG. 5F, the bottom inner surface of the block 12 is viewed from above. Defined in the seat 88 are two threaded apertures 90 for receiving screws to hold the spring and screw assembly to the block 12. The platform 80 defines four threaded apertures 91 to receive screws to hold the base 13 to the block 12.

Figure 6A:
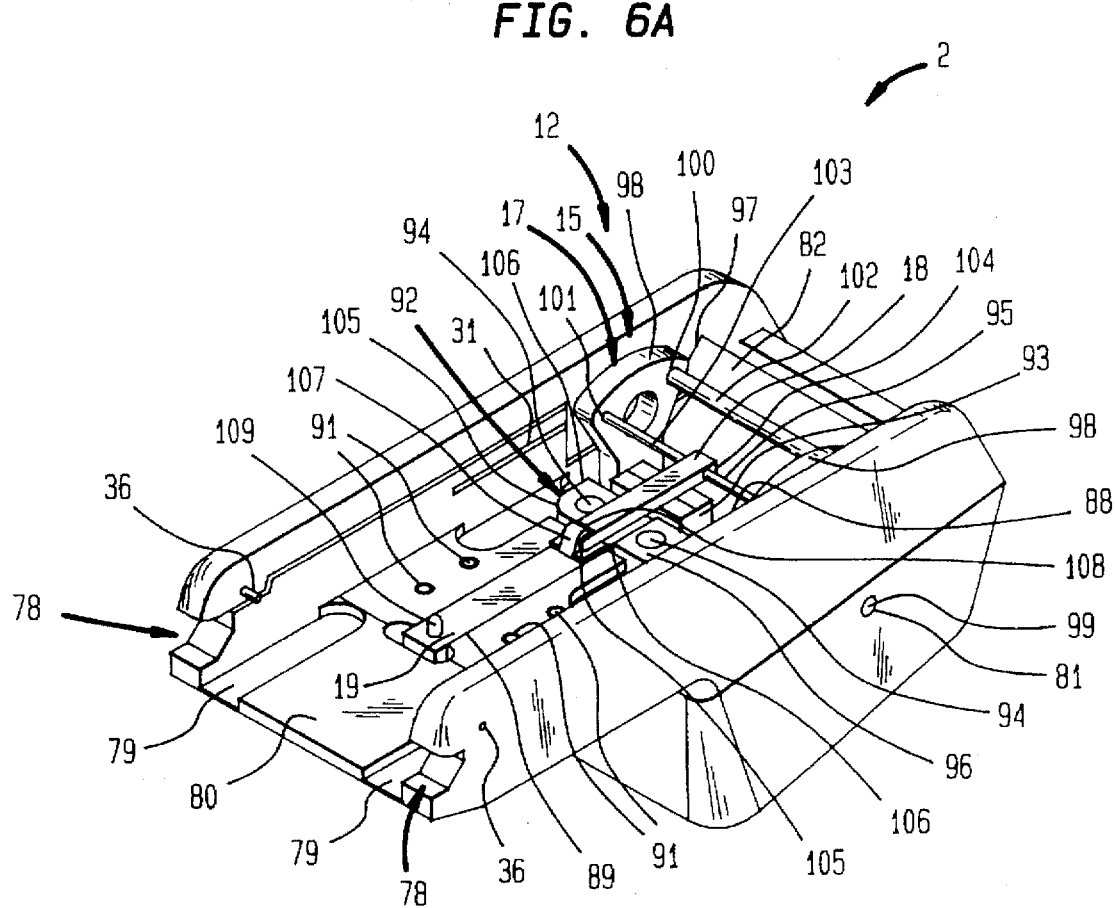
FIGS. 6A and 6B are perspective and top plan views, respectively, of a portion of the housing in which is fitted a portion of an actuator assembly and a spring and switch assembly for the first embodiment of the apparatus.

In FIG. 6A, a perspective view of a portion of the housing 2 includes the block 12 in which is situated a portion of the actuator assembly 15 and the spring and switch assembly 92. The spring and switch assembly 92 includes a base 93 which is mounted to the seat 88 with screws 94 that are screwed into the threaded apertures 90 (see, e.g., FIG. 5F). To the base 93, a switch 95 and spring 96 (only partially visible in FIG. 6A) are mounted.

FIG. 6A shows a portion of the actuator assembly 15 including the actuator arm assembly 17, and the links 18, 19. The actuator arm assembly 17 includes a member 97, U-shaped when viewed from its front or rear, which has two opposing parts 98 joined by a crosspiece (not visible in FIG. 6A). The parts 98 have three pairs of corresponding apertures, one pair (not shown in FIG. 6A) toward the bottom of the parts 98 in proximity to the crosspiece and two pairs 100, 101 toward the top of the parts 98. Through the bottom pair of apertures in the parts 98, an axle 99 is inserted. This axle 99 also extends through the apertures 81 on the sides of the block 12. The member 97 rocks or pivots relative to the block 12 about the axle 99. The pairs of apertures 100, 101 defined on the upper portion of the parts 98 receive respective pins 102, 103. The pin 102 engages with the claw 23 of the actuator 7, and the pin 103 extends through an aperture 104 defined in one end of the link 18. The link 18 can thus pivot about the pin 103. At its other end, the link 18 has two parallel, opposing extensions 105 defining respective aligned apertures 106. Between the extensions 105 is situated an arm 107 of the link 19. The arm 107 defines an aperture (not visible in FIG. 6A). To join the links 18, 19, a pin 108 is inserted through the apertures 106 of the extensions 105 and the aperture defined in the arm 107 of the link 19. The link 18 is thus rotatably coupled to the link 19. At the end opposite the arm 107, the link 19 has a pin 109 for coupling to other parts of the actuator assembly 15 that will be described in detail with reference to FIGS. 9A and 9B.

Figure 6B:
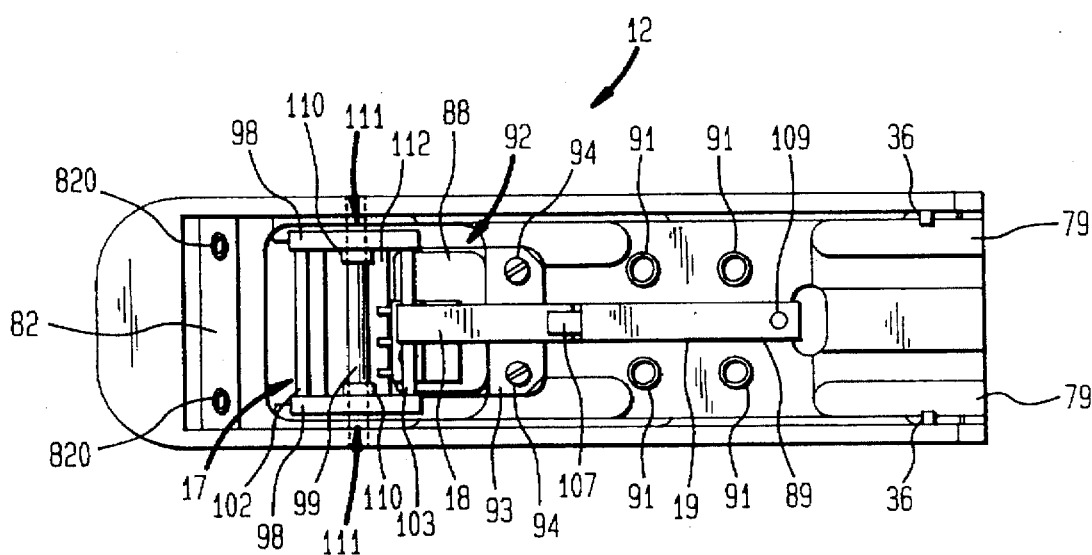

FIG. 6B is a top plan view of the housing 2, a portion of the actuator assembly 15, and the spring and switch assembly 92 of FIG. 6A. Worth noting in FIG. 6B with respect to the actuator arm assembly 17, the axle 99 is preferably fitted with plastic bushings 110. The bushings 110 have cylindrical portions inserted into the pair of apertures 111 defined in the parts 98 which were mentioned with respect to FIG. 6A, and through which are inserted the axle 99 so that the bushings 110 are disposed between the parts 98 and the axle 99. The bushings 110 also have flanges which ride between respective parts 98 and inner side surfaces of the housing block 12 to reduce friction therebetween. Also visible in FIG. 6B is the crosspiece 112 previously mentioned with respect to FIG. 6A, which extends between the two parts 98 of the actuator arm assembly 17.

As previously mentioned, an operator can move the actuator 7 (not shown in FIG. 6B) to control the macrobend/microbend unit 3. Because the claw 23 of the actuator 7 engages with the pin 102, the actuator arm assembly 17 will rock forward toward the front end of the block 12 if the operator pushes the actuator 7 forward, and conversely, will rock backward if the operator pulls the actuator 7 back toward the rear of the housing 2, as shown by the direction arrows in FIG. 6B. The rocking of the actuator arm assembly 17 in either the forward or reverse direction causes the links 18, 19 to move forward toward the front end of the block 12 or backward away from the front end of the block 12, as indicated by the direction arrows in FIG. 6B.

Figure 7:
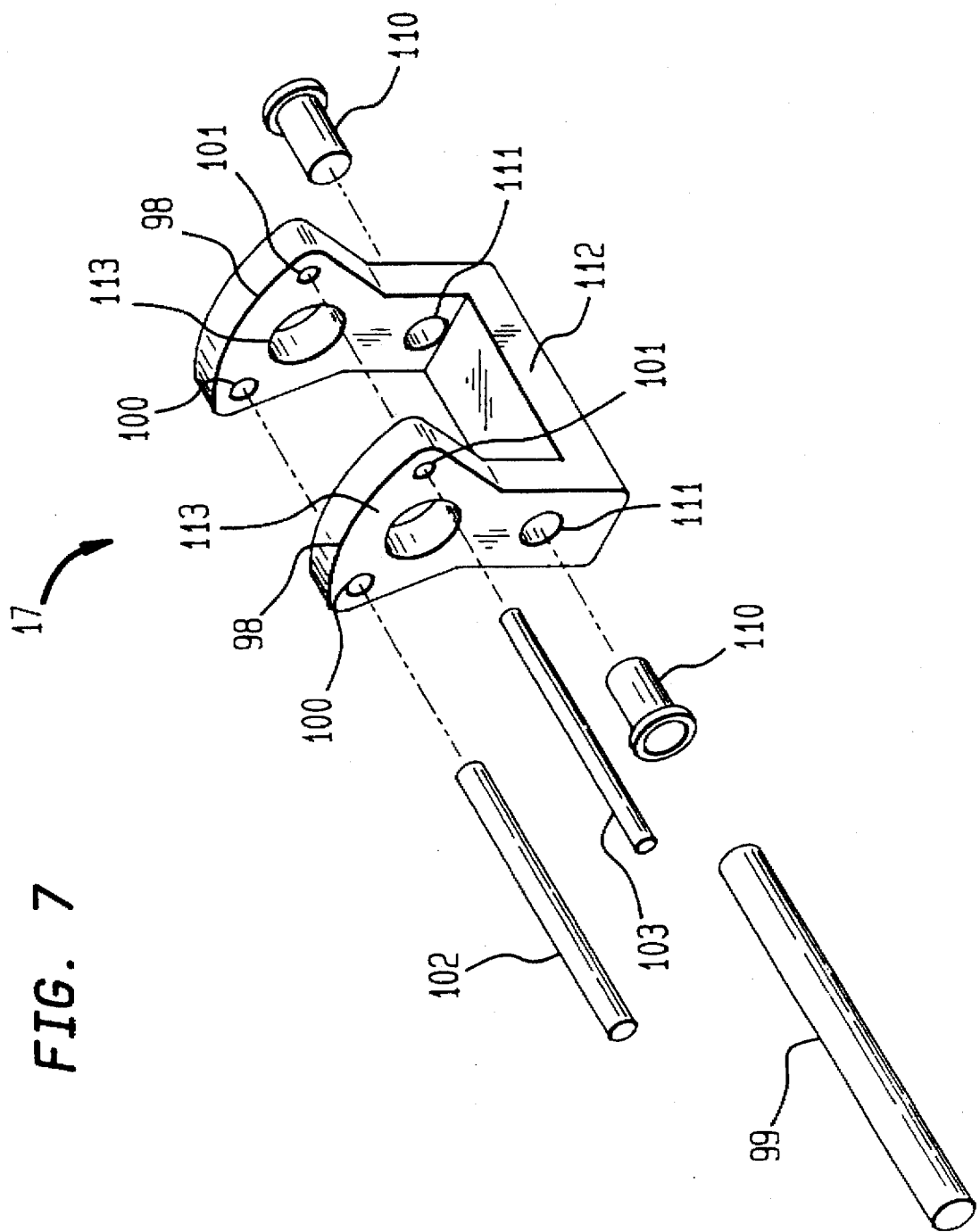
FIG. 7 is an exploded perspective view of an actuator arm assembly for the apparatus.

In FIG. 7, an exploded perspective view is shown of the actuator arm assembly 17. All features of the actuator arm assembly 17 have been previously described with the exception of the openings 113 which are merely defined in the parts 98 to allow tools to be inserted into the parts 98 when positioning the actuator arm assembly 17 in the housing block 12 during assembly.

FIG. 8A is a perspective view of the spring and switch assembly 92. The switch 95 can be a standard microswitch mounted to the base 93 with screws 114. The switch 95 is electronically coupled by conductive wires attached to terminals 115, 116, to the optical fiber status determination and battery/display test circuitry on the circuit board(s) 41 housed in the grip 8. The terminal 117 is for shielding and can, if desired, be coupled by wire to any metal part of the apparatus 1, or can be left unconnected.

The base 93 defines a recess 118 in which is situated the spring assembly 96. The spring assembly 96 includes a push rod 119, a cylinder 120, a spring 121, a washer 122 and a retaining ring 123. The push rod 119 has a shaft to one end of which is attached a flat head. To assemble the spring assembly 96, the spring 121 is inserted over the end of the shaft of the push rod 119 so that the spring 121 is coiled about the shaft of the push rod 119. The cylinder 120 is then slid over the end of the shaft of the push rod 119 so that it encloses the spring 121 and a portion of the shaft. The assembled push rod 119, cylinder 120 and spring 121 are positioned in the recess 96 of the base 93, and the end of the shaft opposite the flat head is inserted through aperture 124 defined in a wall 125 of the base 93. From the opposite side of the wall 125, the washer 122 is slipped over the end of the shaft of the push rod 119. The end of the shaft of the push rod 119 has a circumferential groove 126 defined therein to which the retaining ring 123 is fitted to hold the spring assembly 96 together and to the wall 125. More specifically, the retaining ring 123 is substantially C-shaped when viewed from its front or rear, and has an inner diameter which corresponds to the diameter of the groove 126. The retaining ring 123 is flexible to a degree so that, when the open portion of the C-shaped retaining ring 123 is positioned in the groove 124 and forced transversely to the axis of the shaft of the push rod 119, the ring 123 slips over the shaft so that the inner diameter of the ring 123 rests in the groove 126. When the spring assembly 92 is thus mounted to the base 93, the spring 121 is compressed to a degree between the wall 125 and the flat head of the push rod 119. Thus, the flat head of the push rod 119 is urged by the spring 121 toward the right in FIGS. 8A and 8B.

The spring and switch assembly 92 is mounted to the seat 93 inside of the housing block 12 with screws 94 (see FIGS. 6A and 6B) inserted in holes 127 (see FIG. 8A). When mounted to the seat 93, the spring and switch assembly 92 is positioned under the link 18 of the actuator assembly 15 so that the flat head of the push rod 119 rests adjacent the end of the link 19 from which the arm 107 extends. The spring and switch assembly 92 is operated as follows. In the absence of motive force applied by the operator, because one end of the spring 121 is fixed to the wall 125, the flat head of the spring assembly 96 urges the link 19 forwardly toward the front end of the block 12. When the operator pulls back the actuator 7 in a direction toward the rear of the apparatus 1, the actuator arm assembly 17 is rocked backwardly about axle 99 away from the nose 4. This action causes the link 18 to move backwardly which in turn causes the end of the link 19 adjacent arm 107 to press against the flat head of the push rod 119. The push rod 119 is thus caused to move backwardly through the aperture 124 in the wall 125 as the spring 121 is compressed. The end of the push rod 119 opposite the flat head of the push rod 119, moves backwardly toward the left in FIG. 8B, and depresses switch button 128 of the switch 95. The depressing of the switch button 128 causes switch closure which couples terminals 115, 116 to activate the circuitry on circuit board(s) 41 in a manner to be discussed later in this document with respect to FIG. 16A. On the other hand, when the actuator 7 is released by the operator, the spring 121 extends to its uncompressed position, thus releasing the button 128 and forcing the end of the link 19, and hence the link 18, the actuator arm assembly 17 and the actuator 7 forwardly relative to the housing 2 and toward the nose 4 of the apparatus 1.

Figure 9A:
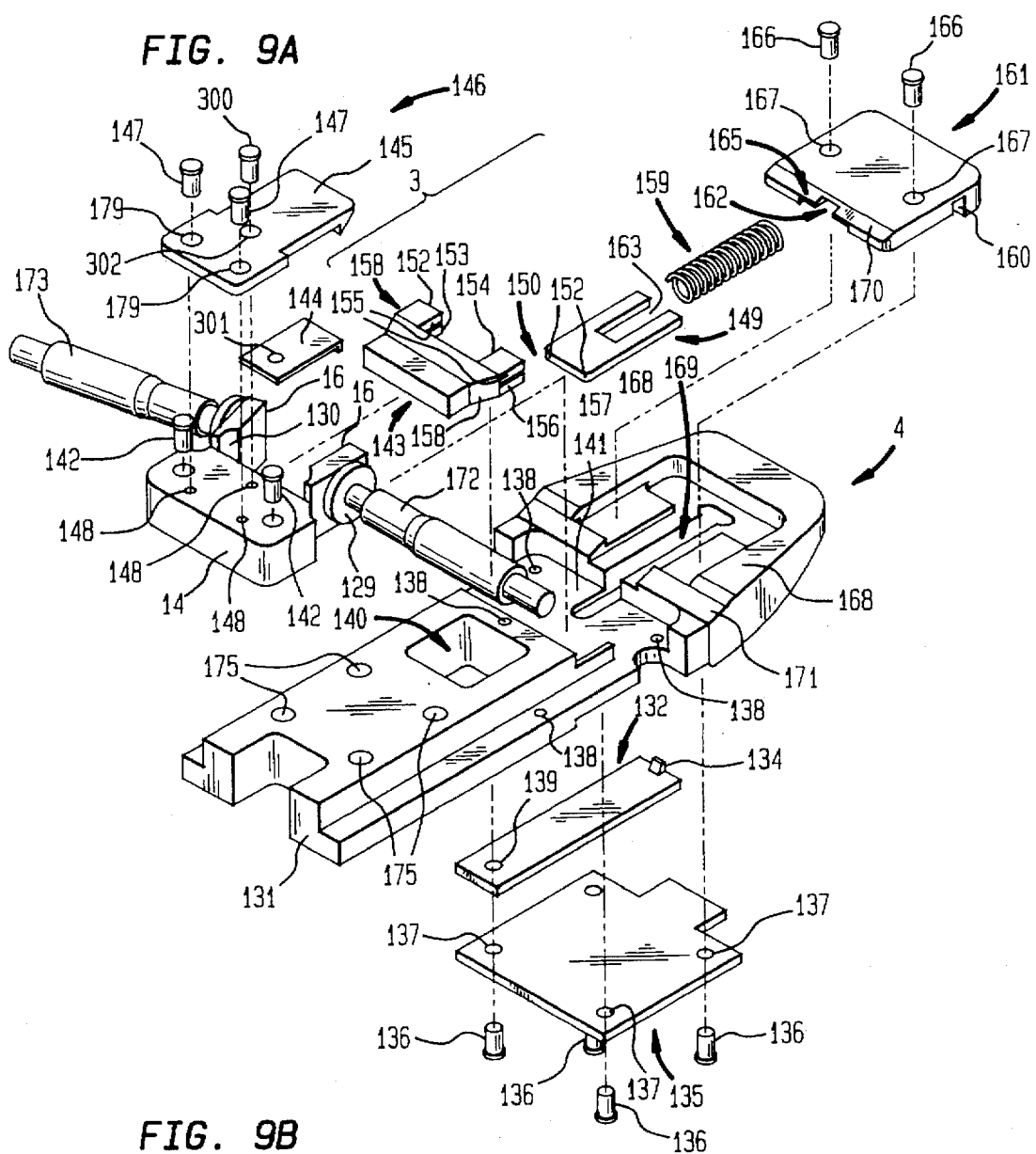
FIGS. 9A and 9B are exploded and assembled perspective views, respectively, of a portion of the actuator assembly and housing, the macrobend/microbend unit and photodetectors for the first embodiment of the apparatus.

In FIG. 9A, a portion of the actuator assembly 15, the macrobend/microbend unit 3 and right and left photodetectors 129, 130, and a portion of the housing 2 that supports the portion of the actuator assembly 15, the macrobend/microbend unit 3 and the photodetectors 129, 130, are shown. A base 131 is a part of the housing 2, and has a tapered front end defining the nose 4. On its underside, the base 131 has a track defined therein into which a link 132 is fitted. Toward its front end, the base 131 has a slot 133 defined therein which extends through the base 131 from its top to bottom sides, and which extends along the longitudinal axis of the base 131. A finger 134 extending upwardly from the link 132 extends into the slot 133 when the finger 132 is inserted into the track situated on the under side of the block 131. To hold the link 132 in the track defined in the underside of the base 131, a plate 135 is mounted to the underside of the base 131 with screws 136 extending through respective holes 137 in the plate 135 and screwed into respective threaded apertures 138 in the base 131. The link 132 is thus confined between the underside of the base 131 and the top side of the plate 135, but can slide in a direction along the longitudinal axis of the base 131 as the finger 134 slides in the slot 133. At its end opposite the finger 134, the link 132 has a hole 139 therein. The hole 139 receives the pin 109 at the end of the link 19 (not shown in FIG. 9A, but shown in FIGS. 6A and 6B). To allow the pin 109 to move along the longitudinal axis of the base 131 under the motive force applied by an operator to the actuator 7, the base 131 defines an opening 140 extending from its top to bottom sides in which the pin 109 can freely move.

Substantially in its middle portion, the base 131 has a seat 141 that is a recessed area defined in the top side of the base 131. To the seat 141, the carrier 14 is mounted with screws 142. In respective collars 16, the photodetectors 129, 130 are mounted. Between the photodetectors 129, 130, a first bend-imposing member 143 is situated and held in position between the seat 141 and a clamp plate 144 that is substantially L-shaped when viewed from its side. The end of the shorter side of the L-shaped clamp plate 144 engages with and fixes the first bend-imposing member 143 in position in the seat 141. The clamp plate 144 is held against the first bend-imposing member 143 and to the carrier 14 with a screw 300 inserted through an aperture 301 defined in the clamp plate 144 and screwed into a corresponding aperture 148 of the carrier 14. A fiber guide 145 is mounted to the carrier 14 with screws 147 inserted through apertures 179 and threaded into respective apertures 148 defined in the carrier 14. The clamp plate 145 also defines an aperture 302 that overlies the aperture 301 in the clamp plate 144. The aperture 302 allows access for a screwdriver to tighten or loosen the screw 300. On its underside not visible in FIG. 9A, the guide 145 has a recessed area in which the clamp plate 144 is seated when the carrier 14, the first bend-imposing member 143, the clamp plate 144 and the fiber guide 145 are assembled together. At its front end, the fiber guide 145 has an angled surface 146 which, from its top to bottom sides, slopes toward the rear of the apparatus 1 and toward the macrobend/microbend unit 3, to aid in guiding an optical fiber into or out of the macrobend/microbend unit 3.

The macrobend/microbend unit 3 includes a second bend-imposing unit 149. The second bend-imposing unit 149 has a front end surface 150 opposing the first bend-imposing member 143. The front end surface 150 has defined in its center a microbend portion 151 with two macrobend portions 152 defined on each side of the microbend portion 151. The microbend portion 151 has relatively closely-spaced bends or undulations defined in the front end surface 150 that undulate in a direction from one to the other side of the second bend-imposing unit 149 and thus across the front end surface 156. The two macrobend portions 152, on the other hand, are gradually bending surfaces preferably symmetrically disposed relative to the longitudinal axis of the second bend-imposing unit 149 in FIG. 9A. The first bend-imposing member 143 has a front end surface 153 with a microbend portion 154 centered between two macrobend portions 155. The microbend portion 154 and macrobend portions 155 of the first bend-imposing member 143 have bends corresponding to the bends in the microbend portion 151 and the macrobend portions 152, respectively, of the second bend-imposing member 149. Thus, when an optical fiber is positioned between the first and second bend-imposing members 143, 149, and the first and second bend-imposing members 143, 149 are brought together from opposite sides of the optical fiber, the microbend portions 151, 154 and the macrobend portions 152, 155 impose a microbend and two macrobends on the optical fiber. To aid in holding the optical fiber in position between the respective front end surfaces 150, 153 of the first and second bend-imposing members 143, 149, the first bend-imposing member 143 has side extensions 156 disposed on respective sides of the front end surface 153. The side extensions 156 define slots 157 (only one of which can be seen in FIG. 9A) which receive and hold respective portions of an optical fiber so that between these held portions, the optical fiber extends across the front end surface 153 of the first bend-imposing member 143. The side extensions 156 thus hold the optical fiber in the proper position between the first and second bend-imposing units 143, 149 so that the microbend and two macrobends can be imposed upon the optical fiber when the first and second bend-imposing members 143, 149 are brought together from opposing sides of the optical fiber.

The first bend-imposing unit 143 has viewing surfaces 158 disposed on the sides thereof. The viewing surfaces are arranged near respective macrobend portions 155 and approximately parallel to respective light-detecting surfaces of the right and left photodetectors 129, 130. To allow light escaping the core of the optical fiber at either macrobend portion to reach the photodetectors 129, 130, the first bend-imposing unit 143 is composed of a material transparent to the light of interest in the optical fiber. For example, the first bend-imposing member 143 can be made of a transparent plastic material such as polycarbonate.

To bias the second bend-imposing member 149 toward the first bend-imposing member 143, a coil spring 159 is used. When assembled in the nose 4, the coil spring 159 has one end fixed in position in an aperture defined in a surface 160 on the underside of a nose plate 161. The nose plate 161 also defines a channel 162 extending along a center axis of the nose plate 161 in a direction perpendicular to the surface 160. When the base 131 and the nose plate 161 are assembled together, the surfaces of the nose plate 161 defining the channel 162 and the upper edges of the surfaces of the base 131 defining the slot 133, confine the spring 159 so that the spring 159 can only be compressed or extended along its center axis. The other end of the spring 159 is fitted into a slot 163 defined in the rear end of the second bend-imposing member 149. The base 131 defines adjacent to the upper side of the slot 133 a groove 164 corresponding to a groove 165 defined in the nose plate 161. When the base 131 and the nose plate 161 are assembled together, the second bend-imposing member 149 is constrained to slide in the grooves 164, 165, only in a direction coaxial with the center axis of the coil spring 159. The nose plate 161 is joined to the base 131 with screws 166 inserted through apertures 167 defined in the nose plate 161 and screwed into threaded apertures 168 defined in the base 131.

Although not visible in FIG. 9A, the second bend-imposing member 149 has a finger 169 extending downwardly from its underside. The finger 134 of the link 132 meets with the finger 169 of the second bend-imposing member 149. Accordingly, when the apparatus 1 is assembled, the spring assembly 96 (see FIGS. 6A, 6B, 8A, 8B) is compressed to a degree to force the links 18, 132 against the finger 169 in a forwardly direction toward the nose 4, while the spring 159 is compressed to a degree to force the second bend-imposing member 149 in the opposite direction. Thus, absent any force exerted on the actuator 7, the opposing forces of the spring assembly 96 and the spring 159 reach an equilibrium in which the front end surface 153 of the first bend-imposing member 143 is spaced slightly from the front end surface 150 of the second bend-imposing member 149 (hereinafter, this position of the macrobend/ microbend unit 3 may be referred to as the 'neutral' position). If the operator slides the actuator 7 forwardly toward the nose 4, the actuator arm assembly 17 pivots forward about the axle 99, causing the links 18, 19, 132 to slide forward and force apart the first and second bend-imposing members 143, 149. In this position (which may be referred to hereinafter as the 'load/unload' or, equivalently, the 'capture/release' position), an optical fiber can be slid from or into the macrobend/microbend unit 3 in the slot 5 defined on one side by surfaces 170, 171 of the nose plate 161 and base 131, respectively, and defined on the other side by the angled surface 146 of the fiber guide 145. If the operator releases the actuator 7, the spring 159 acts against the second bend-imposing unit 149 to force the links 132, 19, 18 back toward the rear end of the apparatus 1. This action in turn causes the actuator arm assembly 17 to pivot backward about the axle 99 to move the actuator 7 backwardly toward the rear of the apparatus 1. However, the spring assembly 96 loads as the links 18, 19 and 132 move backward until equilibrium is established between the opposing forces of the spring assembly 96 and the spring 159 so that the macrobend/microbend unit is in its neutral position with the first and second bend-imposing units spaced slightly apart. On the other hand, if the operator pulls the actuator 7 backwardly toward the rear of the apparatus 1, the actuator arm assembly 17 pivots backwardly on the axle 99 and therefore pulls the links 18, 19 and 132 backward. In this position, the finger 134 of the link 132 is pulled backwardly sufficiently far that the finger 134 is no long in contact with the finger 169 of the second bend-imposing member 149. The spring 159, thus unrestrained by the actuator assembly 15, exerts its spring force to move the second bend-imposing member 149 toward the first bend-imposing member 143. If an optical fiber is loaded into the apparatus 1 at this time, the first and second bend-imposing members 143, 149 impress a microbend and macrobends on either side of the microbend, onto the optical fiber. In this 'read status' mode of the macrobend/microbend unit 3, the status determination circuitry on the circuit board(s) 41 and the display 6 are powered due to the closure of the switch 95, to determine whether the status of the optical fiber. If light is travelling toward the right on the optical fiber relative to the rear of the apparatus 1, a portion of the light will escape the fiber's core due to the microbend and the macrobend on the right side of the macrobend/microbend unit 3, and this light will travel through the first bend-imposing member 143 to be received by the right photodetector 129. Based on the received light, the right photodetector 129 generates a signal indicating that light is present (that is, the fiber is 'live') and travelling toward the right on the optical fiber. Via conductive wires 172 coupled between the right photodetector 129 and the status determination circuitry on the circuit board(s) 41, the signal generated by the right photodetector 129 is transmitted to the status determination circuitry. Based on the signal from the right detector 129, the status determination circuitry drives the display 6 to indicate that light is travelling toward the right in the optical fiber, and hence indicating that the optical fiber is live. On the other hand, if light is travelling on the optical fiber toward the left relative to a perspective facing the rear of the apparatus 1, the microbend and the left-side macrobend impressed upon the optical fiber by the macrobend/microbend unit 3 causes light to escape the core of the optical fiber, to travel through the transparent first bend-imposing unit 143 and to be received by the left photodetector 130. Based on the received light, the left photodetector 130 generates a signal supplied to the status determination circuitry on the circuit board(s) 41 on conductive wires 173 coupled therebetween. If no significant light is present on the optical fiber (i.e., the optical fiber is 'dead'), the respective signals generated by the right and left photodetectors 129, 130 are supplied to the status determination circuitry which controls the display 6 accordingly.

Figure 9B:
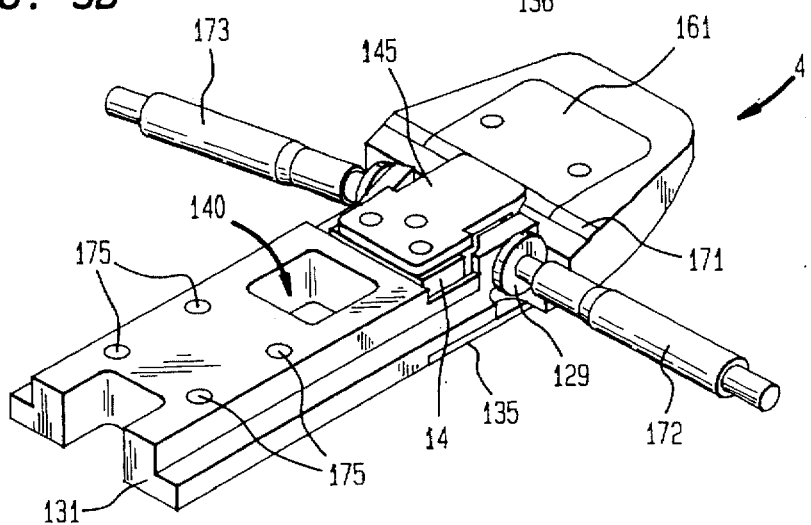

FIG. 9B shows the portion of the housing 2, the portion of the actuator assembly 15, the macrobend/microbend unit 3 and the right and left photodetectors 129, 130 of FIG. 9A in their assembled configuration. The assembly of FIG. 9B is joined to the block 12 by linking the finger 109 to the aperture 139 defined in the link 132, and by inserting screws 174 (see FIG. 2) through respective apertures 175 in the base 131, and screwing the screws 175 into the threaded apertures 91 in the block 12. The conductive wires 172, 173 are positioned inside of the block 12 and extend from respective photodetectors 129, 130 along the inner side surfaces of the block 12 and through the opening 84 in the block 12 (see, e.g., FIGS. 5B or 5D) into the grip 8 where they are coupled to the circuit board(s) 41.

Figure 10C:
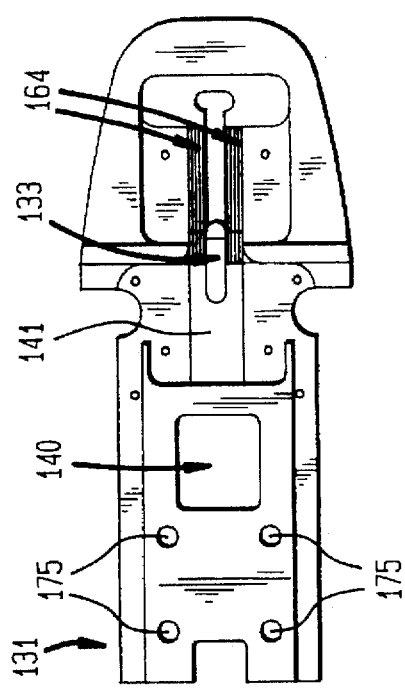
FIGS. 10A–10D are upperside and underside perspective views, a bottom view and a side view, respectively, of a base for the housing of the first embodiment of the apparatus.
Figure 10D:
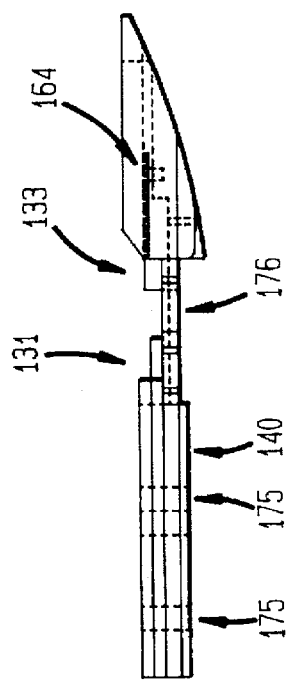
Figure 10A:
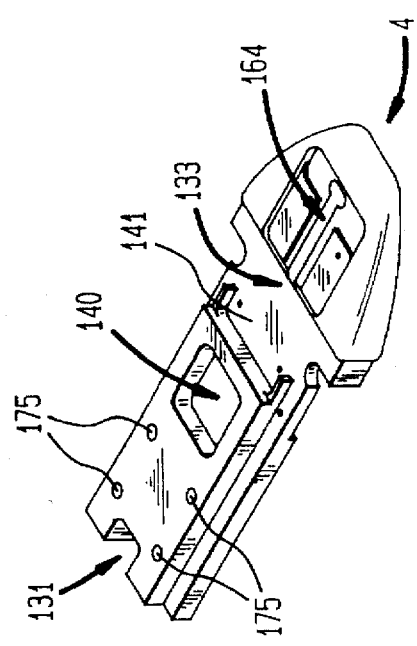
Figure 10B:
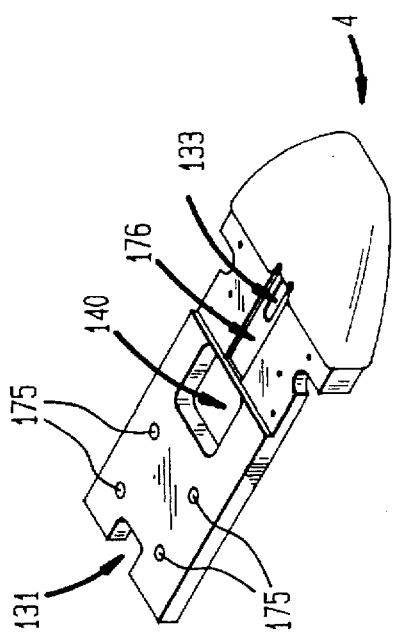

FIGS. 10A–10D are included in this document to provide an appreciation of the configuration of the base 131 in three-dimensions. Of note in FIG. 10B is recessed area 176 in which the link 132 can be slid as the actuator assembly 15 is moved by an operator.

Figure 11:
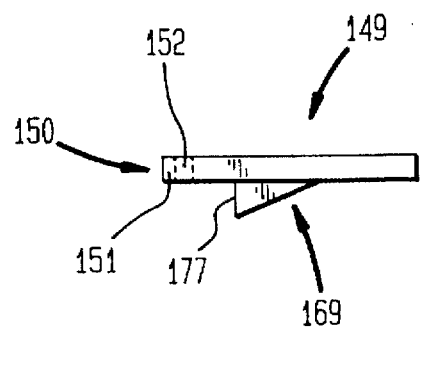
FIG. 11 is a side view of the second bend-imposing member of the macrobend/microbend unit of the first embodiment of the apparatus.

FIG. 11 is a side view of the second bend-imposing member 149. FIG. 11 is included in this document to show the configuration of the finger 169. The finger 169 has a surface 177 which engages with the finger 134 of the link 132 in the neutral or load/unload (i.e., capture/release) modes of operation of the macrobend/microbend unit 3. As previously explained, in the read status mode of operation, the finger 134 of the link 132 is slid backwardly toward the rear of the apparatus 1 so that the finger 134 no longer contacts the surface 177 of the finger 169.

Figure 12:
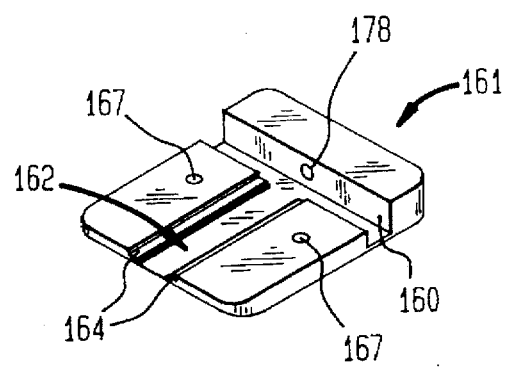
FIG. 12 is a perspective view of the nose plate shown in FIGS. 9A and 9B.

FIG. 12 is a perspective view of the underside of the nose plate 161, that is provided herein to give an appreciation of the nose plate 161 in three-dimensions. As shown in FIG. 12, the surface 160 of the nose plate 161 has an aperture 178 defined therein which receives the end of the spring 159.

Figure 13A:
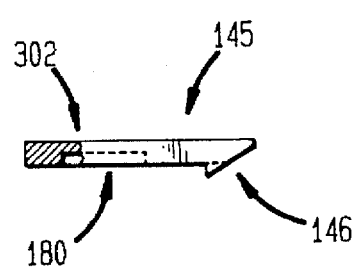
FIGS. 13A and 13B are partial cutaway side and bottom views, respectively, of the fiber guide of FIGS. 9A and 9B.
Figure 13B:
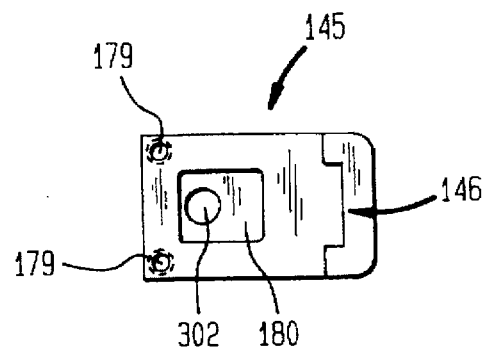

FIGS. 13A and 13B are partial cutaway side and bottom views, respectively, of the fiber guide 145. FIGS. 13A and 13B provide an understanding of the three-dimensional configuration of the fiber guide 145. The fiber guide 145 includes a recessed area 180 into which the clamp 144 fits when assembled with the fiber guide 145.

FIGS. 14A–14E are various views of the cover 11. Noteworthy in FIGS. 14A–14E are several features of the cover 11. The front end of the cover 11 has angled surfaces 181 separated by a gap 182 defined in the cover 11. This gap 182 receives the fiber guide 145 so that its angled surface 146 and the surfaces 181 together form one uniform surface when the cover 11 is assembled to the block 12. The surfaces 146, 181 define one side of slot 5 (see, e.g., FIG. 2) and guide an optical fiber into or out from the macrobend/microbend unit 3. At its rear end, the cover 11 has an upperside slide surface 184 adjacent the slot 24 upon which the actuator 7 can be slid to control the operation mode of the apparatus 1. Also at its rear end, the cover 11 defines two apertures on opposite sides of the slot 24, through which the screws 37 (see FIG. 2, for example) are inserted to hold the rear portion of the cover 11 to the block 12. On its underside, the cover 11 has an underside slide surface 185 positioned beneath the upperside slide surface 184. The underside slide surface 185 contacts the upperside of the claw 23 of the actuator 7 when inserted into the slot 24, to stabilize and smooth the sliding of the actuator 7.

FIG. 15 is a perspective view of the actuator 7 showing in detail its knurled member 20, thin portion 22 and claw 23. As previously explained, the relatively thin portion 22 of the actuator 7 is slid into the slot 24 of the cover 11 so that the underside of knurled member 20 slides in contact with the upperside slide surface 184 and the upperside of the claw 23 in proximity to the thin portion 22, slides in contact with the underside slide surface 185. When the thin portion 22 is inserted into the slot 24, and the cover 11 is joined to the block 12, the actuator 7 is positioned so that the claw 23 engages the pin 102 of the actuator arm assembly 17.

The elements of the apparatus 1 can be made from a variety of materials as will readily occur to those of ordinary skill in the art. Because the apparatus 1 is preferably hand-held, it is desirable to use materials which are lightweight in the apparatus 1. For example, such materials can include aluminum and durable plastics. For elements which are subject to appreciable stress and have relatively small dimensions, and therefore which require stronger materials (such as the pins 102, 103 and the axle 99 of the actuator arm assembly 17), steel or other relatively strong, durable material can be used. As previously explained, the first bend-imposing member 143 is preferably formed of a material transparent to wavelengths of the light of interest on the optical fiber under analysis.

Figure 16A:
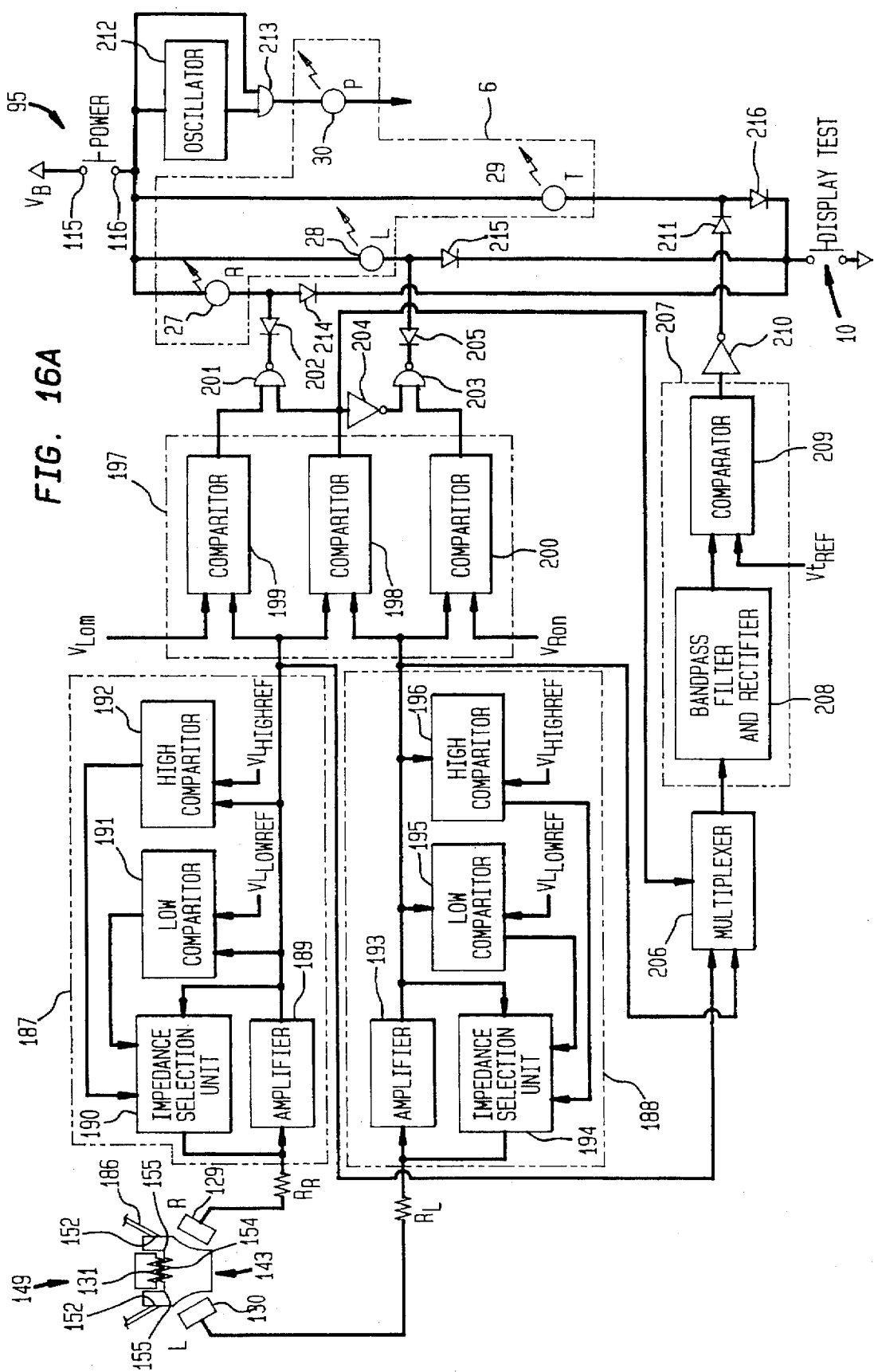
FIG. 16A is a circuit diagram of optical fiber status determination and test circuitry for the apparatus.

FIG. 16A is a circuit diagram of the optical fiber status determination and battery/display test circuitry of the apparatus 1. This circuitry is generally included in the circuit board(s) 41. FIG. 16A also shows the macrobend/microbend unit 3 including the first and second bend-imposing members 143, 149, the right and left photodetectors 129, 130, the display 6 including the LEDs 27–30, the display test button 10 and the switch 95. In the 'status read' mode of operation of the apparatus 1, as shown in FIG. 16A, the optical fiber 186 is squeezed between the first and second bend-imposing members 143, 149 of the macrobend/microbend unit 3. If light is travelling toward the right in FIG. 16A on the optical fiber 186, some of the right-travelling light will escape the core of the optical fiber 186 at the region of the microbend. At the macrobend on the right side of the microbend in FIG. 16A, the right-travelling light, no longer confined in the core of the optical fiber 186, passes due to the gradual bending at the macrobend through the cladding of the optical fiber 186 and the transparent first bend-imposing member 143 and into the photosensitive area of the photodetector 129. The right photodetector 129 thus generates a signal indicative of whether light is present travelling to the right on the optical fiber 186. Conversely, if light is travelling to the left in FIG. 16A on the optical fiber 186, the microbend causes light to escape to a degree from the core of the optical fiber 186, and this left-travelling light passes out of the optical fiber at the left side macrobend to be detected by the left photodetector 130. The left photodetector 130 thus generates a signal indicative of whether light is present on the optical fiber 186 travelling to the left in FIG. 16A.

The right photodetector 129, through resistor $R_R$, is coupled to a right amplification unit 187 which functions to amplify the output signal from the right photodetector 129 with a gain determined based on the voltage level of the output signal from the right photodetector 129. In other words, the right amplification unit 187 amplifies the output signal from the right photodetector 129 using automatic gain control. As shown in FIG. 16A, the right amplifier unit 187 includes an amplifier 189 coupled to receive the signal generated by the right photodetector 129, and generate an amplified output signal based thereon. The amplified output signal from the amplifier 189 is the output signal of the right amplification unit 187. The amplified output signal is fed back to an impedance selection unit 190 which subjects the amplified output signal to a selected impedance, and thus a gain and phase shift, to generate a feedback signal supplied to the input of the amplifier 189. The impedance of the impedance selection unit 190 is controlled by low and high comparators 191, 192 that receive the amplified output signal from the amplifier 189. In the low comparator 191, the level of the amplified output signal is compared with a predetermined d.c. voltage $V_{Rlowref}$. The predetermined voltage $V_{Rlowref}$ is preferably derived from the battery voltage $V_B$ using techniques well-known to those of ordinary skill. For example, the predetermined voltage $V_{Rlowref}$ can be derived from the battery voltage $V_B$ using a voltage divider, or the output of such a voltage divider can be supplied to one input of an operational amplifier with feedback, whose output generates the voltage $V_{Rlowref}$ (the use of feedback in the operational amplifier stabilizes the voltage $V_{Rlowref}$). Also, the voltage $V_{Rlowref}$ can be adjustable by using a potentiometer as one of the two or more series-coupled resisters forming the voltage divider. If the level of the amplified output signal is less than or equal to the predetermined voltage $V_{Rlowref}$, the low comparator 191 generates an output signal coupled to the impedance selection unit 190 which causes the impedance selection unit 190 to increase its impedance and hence the amplification of the amplified output signal generated by the amplifier 189. Otherwise, if the level of the amplified output signal is greater than the predetermined voltage $V_{Rlowref}$, the low comparator 191 does not activate its output signal so that the gain of the impedance selection unit 190 is not affected by the low comparator 191 in this instance. On the other hand, the high comparator 192 compares the level of the amplified output signal from the amplifier 189 with a predetermined d.c. voltage $V_{Rhighref}$ derived from the battery voltage $V_B$ in a manner similar to that explained above with respect to the voltage $V_{Rlowref}$. If the high comparator 192 determines that the level of the amplified output signal is greater than or equal to the predetermined voltage $V_{Rhighref}$, the high comparator 192 activates its output signal that is coupled to the impedance selection unit 190 to cause the impedance selection unit 190 to lower the impedance, and thus the gain, of the amplifier 189. Otherwise, if the level of the amplified output signal of the amplifier 189 is less than the predetermined voltage $V_{Rhighref}$, the high comparator 192 does not activate its output signal so that the impedance selection unit 190 is not affected thereby. Thus, if the level of the amplified output signal of the amplifier 189 falls below $V_{Rlowref}$ or rises above $V_{Rhighref}$, the right amplifier unit 187 will raise or lower its gain to maintain the level of the amplified output signal from the right amplifier unit 187 between the voltages $V_{Rhighref}$ and $V_{Rlowref}$.

Figure 16B:
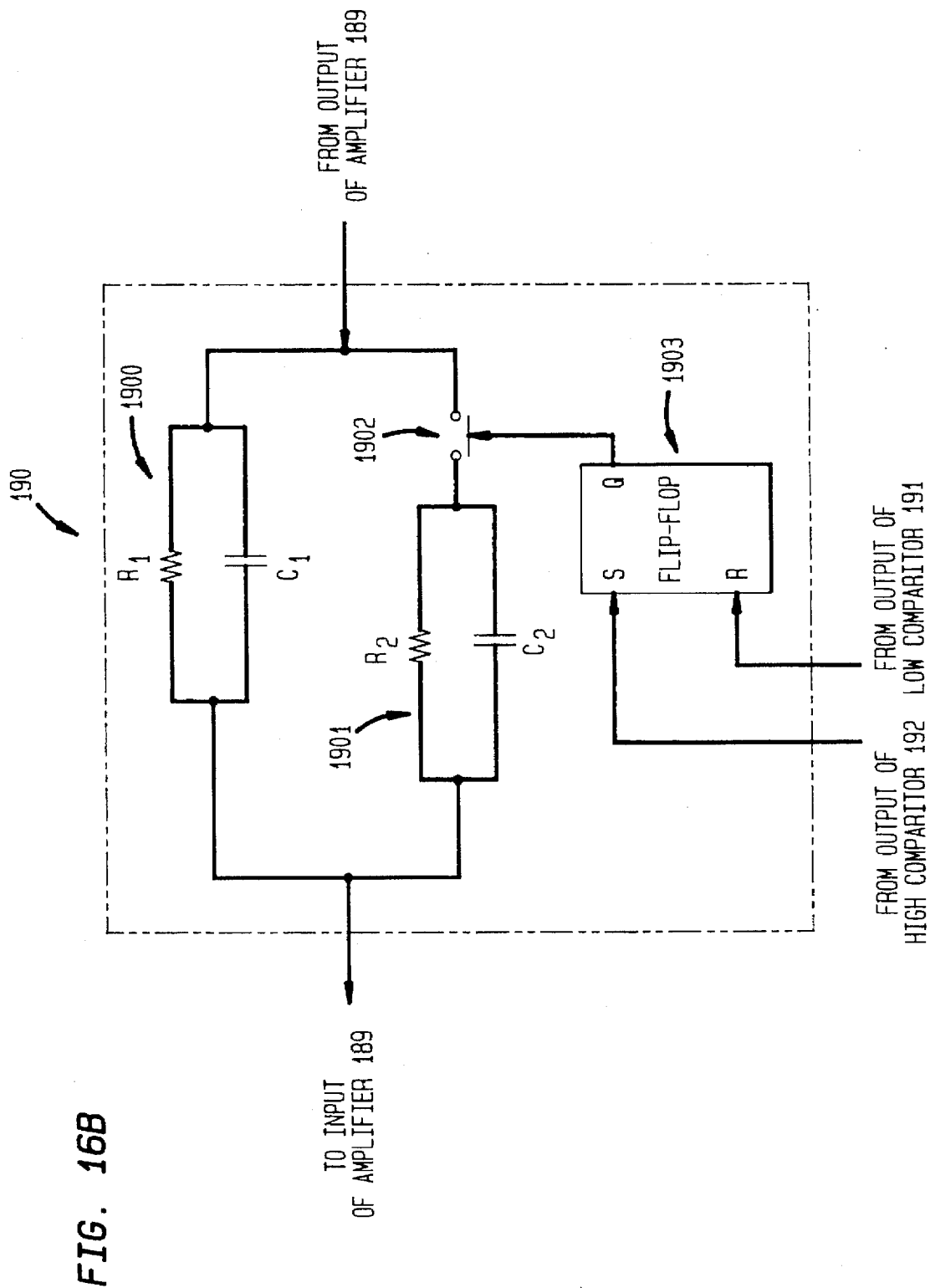
FIG. 16B is a circuit diagram of an impedance selection unit of the circuitry of FIG. 16A.

As shown in FIG. 16B, the impedance selection unit 190 includes a first impedance 1900 including a resistor $R_1$ and a capacitor $C_1$ in parallel, coupled between the input and output of the amplifier 189. The impedance selection unit 190 also includes a second impedance 1901 including a resistor $R_2$ and capacitor $C_2$ in parallel, coupled in series with a switch 1902. The series-coupled combination of the second impedance 1901 and switch 1902 are coupled between the input and output of the amplifier 189. The switch 1902 has an electronically-activated input terminal that opens or closes the switch based on the voltage level at its input terminal. The input terminal of the switch is coupled to the output terminal of an S-R flip flop 1903 receiving the outputs of the high- and low-comparators 192, 191 at set (S) and reset (R) terminals, respectively. When the level of the amplified output signal is greater than or equal to the predetermined voltage $V_{Rhighref}$, the output of the high comparator 192 is activated causing the S-R flip-flop 1903 to set and close the switch 1902 so that the first and second impedances 1900, 1901 are in parallel, and thus in a relatively low-gain state. In this case, the gain of the right amplification unit 187 is proportional to the value of the parallel combination of the first and second impedances 1900, 1901, divided by the value and resistor $R_R$. On the other hand, if the level of the amplified output signal is less than or equal to the voltage $V_{Rlowref}$, the output of the low comparator 191 resets the S-R flip-flop 1903 which opens the switch 1903 so that only the first impedance 1900 is coupled between the input and output of the impedance selection unit 190. In this situation, the right amplification unit 187 is in a relatively high-gain state with a gain proportional to the value of the first impedance 1900 divided by the value of the resistor $R_R$. If the amplified output signal level is between the voltages $V_{Rhighref}$ and $V_{Rlowref}$, the outputs of the low and high comparators 191, 192 are not activated so no change results to the existing impedance of the impedance selection unit 190.

The components of the left amplification unit 188 are similar to those of the right amplification unit 187. Specifically, the left amplification unit 188 includes an amplifier 193, an impedance selection unit 194, a low comparator 195 and a high comparator 196. The amplifier 193 is coupled to receive the output signal of the left photodetector 130 through resistor $R_L$. Based on the output signal from the left photodetector 130, the amplifier 193 generates an amplified output signal that is the output of the left amplification unit 188. The impedance selection unit 194 is coupled to receive the amplified output signal from the amplifier 193. The impedance selection unit 194 subjects the amplified output signal to an impedance that is selected by the low and high comparators 195, 196, and the impedance selection unit 194 is coupled to feed back the amplified output signal through the selected impedance to the input of the amplifier 193. More specifically, the low comparator 195 is coupled to receive the amplified output signal from the amplifier 193 and a predetermined d.c. voltage $V_{Llowref}$. The low comparator 195 compares the amplified output signal level with the voltage $V_{Llowref}$ and, based on this comparison, the low comparator 195 generates an output signal that activates the impedance selection unit 194 to increase the impedance to which the amplified output signal is subjected. The relatively high impedance applied by the impedance selection unit 194 causes the gain of the amplifier 193 to be relatively high so that the amplified output signal is amplified at a relatively high level to compensate for the relative weakness of the output signal from the left photodetector 130. The high comparator 196 is coupled to receive the amplified output signal from the amplifier 193 and a predetermined d.c. voltage $V_{Lhighref}$. The high comparator 196 compares the level of the amplified output signal from the amplifier 193 with the voltage $V_{Lhighref}$ and generates an output signal based on this comparison. If the amplified output signal from the amplifier 193 is greater than or equal to the voltage $V_{Lhighref}$, the high comparator 196 generates an output signal forcing the impedance selection unit 194 into a low impedance state, thus reducing the gain of the left amplification unit 188. On the other hand, if the amplified output signal from the amplifier 193 has a level that is less than the voltage $V_{Lhighref}$, the high comparator 196 deactivates its output signal so that the impedance of the impedance selection unit is not changed by the high comparator 196 in this instance.

The impedance selection unit 194 (not shown in detail) is similar to the impedance selection unit 190 shown in FIG. 16B. The impedance selection unit 194 includes a first impedance, and a second impedance coupled in series with a switch, which are coupled between the input and output of the amplifier 193. The switch has an input coupled to receive the output of an S-R flip-flop with set (S) terminal coupled to receive the output of the high comparator 196, and a reset (R) terminal coupled to receive the output of the low comparator 195. When the amplified output signal level is greater than or equal to the high comparator 196, the output of the high comparator 196 is activated, causing the S-R flip-flop to set and close the switch so that the gain of the amplifier is in a relatively low-gain state proportional to the value of the parallel combination of the first and second impedances, divided by the value of the resistor $R_L$. On the other hand, if the amplified output signal level is less than or equal to the voltage $V_{Llowref}$, the low comparator 195 activates its output signal causing the S-R flip-flop to reset to open the switch, thus increasing the gain to a value proportional to the value of the first impedance divided by the resistor $R_L$. As previously explained, if the amplified output signal level is less than the voltage $V_{Lhighref}$ and greater than voltage $V_{Llowref}$, neither of the outputs of the low or high comparators 195, 196 are activated so that no change results in the existing impedance of the impedance selection unit 194.

The optical fiber status determination circuitry of the apparatus 1 includes a comparator unit 197 coupled to receive the respective amplified output signals from the right and left amplification units 187, 188. The comparator unit 197 includes three comparators 198, 199, 200. The comparator 198 is coupled to receive the amplified output signals from the right and left amplification units 187, 188, and compares the respective levels of the amplified output signals. If the level of the amplified output signal from the right amplification unit 187 is greater than or equal to the level of the amplified output signal from the left amplification unit 188, the comparator 198 generates an output signal which has a low-voltage state. Conversely, if the level of the amplified output signal from the right amplification unit 187 is less than the level of the amplified output signal from the left amplification unit 188, the comparator 198 generates an output signal with a high-voltage state.

The comparator 199 is coupled to receive the amplified output signal from the right amplification unit 187 and a predetermined d.c. voltage $V_{Lon}$ preferably derived based on the battery voltage $V_B$ using techniques as discussed previously with respect to the voltage $V_{Rlowref}$. If the level of the amplified output signal from the right amplification unit 187 is greater than or equal to the voltage $V_{Lon}$, the comparator 199 generates an output signal with a high-voltage state. On the other hand, if the amplified output signal level from the right amplification unit 187 is less than the voltage $V_{Lon}$, the comparator 199 generates an output signal with a low-voltage state.

The comparator 200 is coupled to receive the amplified output signal from the left amplification unit 188 and a predetermined d.c. voltage $V_{Ron}$ preferably derived from the battery voltage $V_B$ using techniques as discussed previously with respect to the voltage $V_{Rlowref}$. If the amplified output signal level from the left amplification unit 188 is greater than or equal to the voltage $V_{Ron}$, the comparator 200 generates an output signal with a high-voltage level. On the other hand, if the amplified output signal level of the left amplification unit 188 is less than the voltage $V_{Ron}$, the comparator 200 generates an output signal with a low-voltage state.

A NAND gate 201 is coupled to receive as inputs the output signals from the comparators 198, 199. The output of the NAND gate 201 is coupled to the cathode of a diode 202. The anode of the diode 202 is coupled to one terminal of the LED 27, and the other terminal of the LED 27 is coupled to one side (i.e., terminal 116) of the power switch 95. The other side (i.e., terminal 115) of the power switch 95 is coupled to receive the battery voltage $V_B$. In the optical fiber status read mode of operation of the apparatus 1, the switch 95 is closed so that current can flow through the switch 95 if not otherwise prevented from doing so.

If either or both of the outputs of the comparators 198, 199 are in a low-voltage state, the output of the NAND gate 201 is in a high-voltage state. The high-voltage state at the output of the NAND gate 201 reverse-biases the diode 202 so that no current flows therethrough. Thus, with current flow prevented by the reverse-biased diode 202, the LED 27 does not emit any appreciable light and thus indicates the absence of any light travelling to the right on the optical fiber 186. On the other hand, if both of the outputs of the comparators 198, 199 are in a high-voltage state, the output of the NAND gate 201 will be in a low-voltage state so that the diode 202 is forward-biased. In this forward-biased state, current flows through the diode 202 and the LED 27 so that the LED 27 illuminates to indicate the presence of light travelling to the right on the optical fiber 186.

A NAND gate 203 is coupled to receive as inputs the output of the comparator 200 and the output of an inverter 204 having an input coupled to the output of the comparator 198. The output of the NAND gate 203 is coupled to the cathode of the diode 205 whose anode is coupled to one terminal of the LED 28. The other terminal of the LED 28 is coupled to the switch 95 which is closed in the optical fiber status read mode of operation. If either the output of the comparator 200 is in a low-voltage state or the output of the comparator 198 is in a high-voltage state (so that the output of the inverter 204 is in a low-voltage state), the output of the NAND gate 203 will be in a high-voltage state, a condition that reverse-biases the diode 205. The reverse-biased condition of the diode 205 prevents current from flowing in the LED 28 so that the LED 28 is not illuminated. Accordingly, the diode 28 indicates that no light is present travelling to the left on the optical fiber 186. On the other hand, if the output of the comparator 198 is in a low-voltage state (so that the output of the inverter 204 is in a high-voltage state) and the output of the comparator 200 is in a high-voltage state, the output of the NAND gate 203 will be in a low-voltage state so that the diode 205 is forward biased. Accordingly, current flows from the battery through the closed switch 95, the LED 28 and the diode 205 so that the LED 28 is illuminated. The illumination of the LED 28 indicates that light is present travelling to the left on the optical fiber 186.

As previously mentioned, the LEDs 27, 28 indicate whether the optical fiber 186 is live or dead because, if the optical fiber is live, one of the LEDs 27, 28 will be illuminated, and if the optical fiber is dead, neither of the LEDs 27, 28 will be illuminated.

The optical fiber status determination circuitry has the capability to determine whether a tone signal is present on the optical fiber 186. The tone signal is a light signal that is intensity-modulated at a particular fixed frequency. In some instances, an optical fiber in a cable may not carry any traffic because the current usage level of the communications network does not as yet justify the connection of the optical fiber into the network, or because an optical fiber may be designated as a standby carrier for signal traffic in the event of the failure of another signal transmission path in the network. Without the transmission of light into such optical fiber, it generally cannot be determined whether the optical fiber is damaged or not. Thus, a tone signal can be generated and transmitted into such optical fiber by equipment in a central office to determine the status of the optical fiber. To determine the presence or absence of the tone signal, a 2:1 multiplexer 206 receives as inputs the respective output signals from the right and left amplification units 187, 188. The select input of the multiplexer 206 is coupled to receive the output of the comparator 198. If the level of the amplified output signal from the amplifier 189 is greater than or equal to the level of the amplified output signal from the amplifier 193, the output signal from the right amplifier unit 187 is output from the multiplexer 206. On the other hand, if the level of the amplified output signal from the right amplifier unit 187 is less than the level of the output signal from the left amplifier unit 188, the multiplexer 206 outputs the signal from the left amplifier unit 188. The output of the multiplexer 206 is coupled to the input of a tone detection circuit 207. The tone detection circuit 207 includes a band-pass filter and rectifier unit 208 with an input coupled to receive the output of the multiplexer 206. The band-pass filter and rectifier unit 208 allows frequency components of the output signal from the multiplexer 206 to pass therethrough, and rejects frequency components not in the pass-band of unit 208. After band-pass filtering the output signal from the multiplexer 206, the unit 208 also rectifies and filters the signal and outputs the rectified signal to a comparator 209. The comparator 209 has one input coupled to receive the rectified signal from the unit 208, and has another input coupled to receive a predetermined voltage $V_{Tref}$ derived from the battery voltage $V_B$ preferably in a manner similar to that in which the voltage $V_{Rlowref}$ is derived from the battery voltage $V_B$. If the tone signal is present on the optical fiber 186, the rectified signal will be greater than or equal to the voltage $V_{Tref}$ so that the comparator 209 will generate an output with a high-voltage state. If the tone signal is not present on the optical fiber, the rectified signal will be less than the voltage $V_{Tref}$ so that the comparator 209 will generate an output with a low-voltage state. The output of the comparator 209 is coupled to the input of an inverter 210 whose output is coupled to the cathode of a diode 211. The anode of the diode 211 is coupled to one terminal of the LED 29 and the other terminal of the LED 29 is coupled to the switch 95. If the output of the inverter 210 is in a high-voltage state, the diode 211 will be reverse-biased so that no current flows from battery through the switch 95, the LED 29 and the diode 211. Thus, in this condition, the LED 29 will not be illuminated indicating that the tone signal is not present on the optical fiber 186. On the other hand, if the output of the inverter 210 is in a low-voltage state, the diode 211 will be forward-biased and conduct so that current flows from the battery through the switch 95, the LED 29 and the diode 211, thus illuminating the LED 29. The illumination of the LED 29 indicates that the tone signal is present on the optical fiber 186.

So that the operator of the apparatus 1 will be able to quickly recognize that the apparatus 1 is powered and in the optical fiber status read mode of operation without the necessity of scrutinizing the display 6, the LED 30 can be made to blink when the switch 95 is closed. More specifically, the switch 95 can be coupled to an oscillator 212 whose output is coupled to one input of an AND gate 213 used to buffer and stabilize the output of the oscillator 212. The other input to the AND gate 213 can be coupled to the switch 95. Accordingly, when the switch 95 is closed, the output of the oscillator 212 will periodically switch between high- and low-voltage states so that the output of the AND gate 213 also periodically switches between high- and low-voltage states, thus causing the LED 30 to blink. Because the LED 30 blinks, the operator can determine, without having to look directly at the display 6, whether the apparatus 1 is in the status read mode and whether the circuit board(s) 41 are powered by the battery.

To ensure that the LEDs 27–30 are properly functioning, the operator can close the switch 95 by pulling back the actuator 7, and depress the display test button 10 simultaneously. In this condition, current will flow from the battery through the closed switch 95, the LEDs 27, 28, 29, through respective diodes 214, 215, 216 with anodes coupled to respective LEDs 27, 28, 29 and with cathodes coupled to one terminal of the display test button 10 whose opposite terminal is coupled to ground. If the LEDs 27–29 are properly illuminating with the actuator 7 pulled backwardly and the display test button 10 closed, the LEDs 27–29 are properly functioning. Otherwise, if one or more of the LEDs 27–29 does not illuminate, there is a problem with the LEDs 27–29 or circuitry coupled thereto so that the apparatus 1 is in need of repair.

Figure 17:
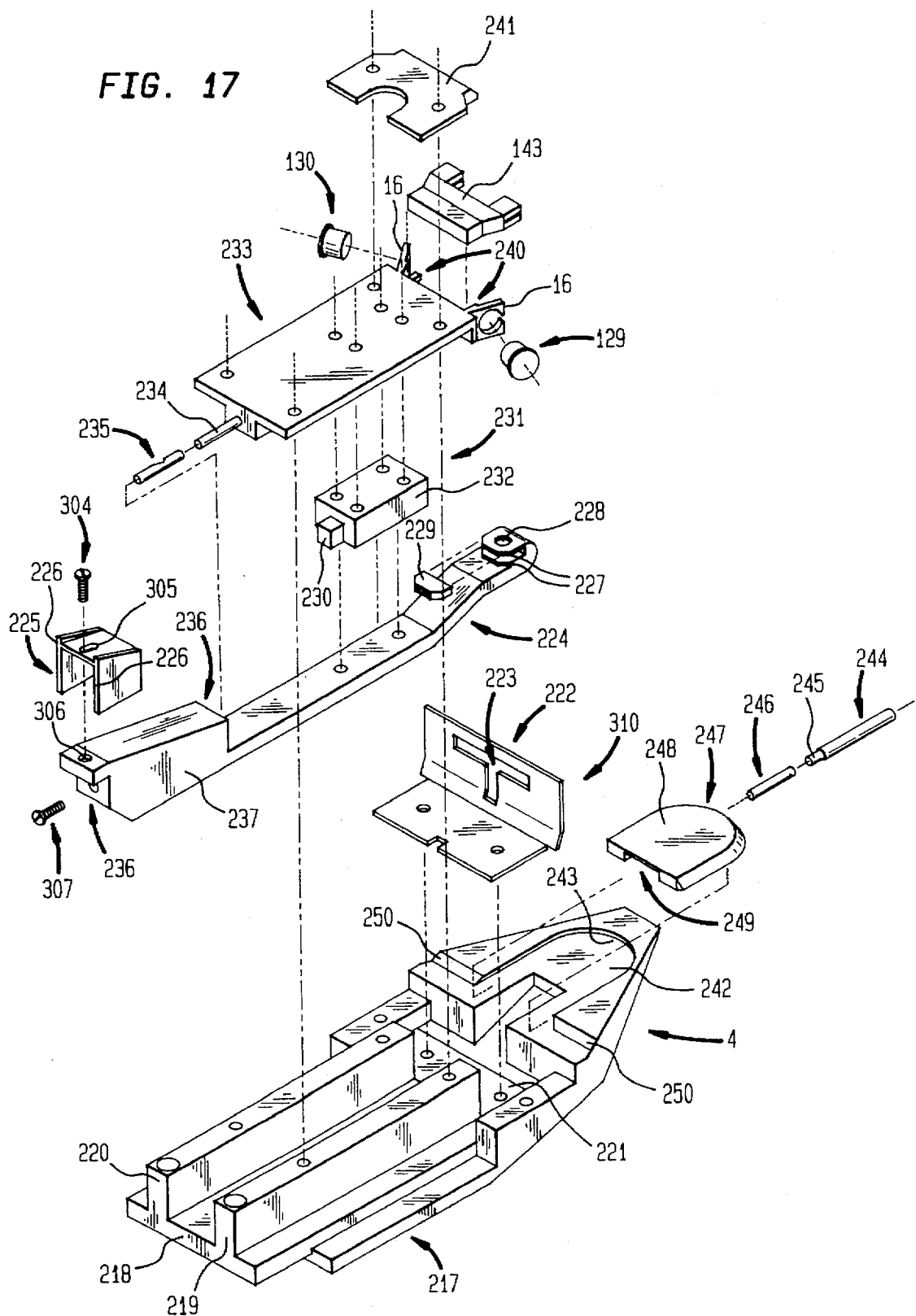
FIG. 17 is an exploded perspective view of portions of a housing and actuator assemblies, a macrobend/microbend unit, photodetectors, and a light shield and light wall, in accordance with a second embodiment of the apparatus.

An assembly for an alternative embodiment of the apparatus 1 is shown in FIG. 17. In this alternative embodiment of the apparatus 1, the assembly of FIG. 17 essentially replaces the assembly of FIGS. 9A and 9B and the links 18, 19 of the first embodiment of this invention. In FIG. 17, a base 217 includes a front end portion defining the tapered nose 4 of the apparatus 1, and a rear end portion which is essentially a planar member 218 approximately perpendicular to and supporting two parallel, opposing members 219, 220. In the middle portion of the base 217 between the ends of the members 219, 220 and the nose 4, the upper surface of the planar member 218 defines a seat 221. To the seat 221, a light wall 222 is mounted with screws (not shown). As so mounted, the light wall 222, substantially L-shaped in cross-section, has one side resting in contact with the seat 221, and another surface extending upward from the seat 221. The light wall 222 has defined therein a T-shaped aperture 223. At its front end, the light wall 222 has a thin resilient pad 310 bonded thereto. The pad 310 can be made of rubber, for example. The pad 310 has a T-shaped aperture defined therein to correspond with the T-shaped aperture 223. In the upper, horizontal portion of the aperture 223, the front end of an elongated linkage arm 224 is disposed. The linkage arm 224 is also situated between the members 219, 220 and is free to slide along the direction between the front and rear of the apparatus 1. The rear of the linkage arm 224 has a coupler 225 attached thereto with a screw 304 inserted through aperture 305 defined in the coupler 225 and threaded into an aperture 306 defined in the block 237. The coupler 225 has vertically extending side ends that engage with the pin 103 of the actuator arm assembly 17 (see, e.g., FIG. 7) so that, in the optical fiber load/unload mode when the actuator 7 is pushed forward by the operator, the actuator arm assembly 17 rocks forward causing its pin 103 to push the linkage arm 224 forward toward the nose 4 of the apparatus 1. Thus, in the embodiment of FIG. 17, the actuator assembly 15 includes the actuator 7, the actuator arm assembly 17, the coupler 225 and the linkage arm 224.

Adjacent the front end of the linkage arm 224, the linkage arm 224 has two parallel plates 227, the upper of which defines an aperture 228. Between the parallel plates 227, a bend-imposing member 229 is situated and locked therebetween with a screw (not shown) threaded into aperture 228. The bend-imposing member 229 thus has a convex surface facing toward the rear of the apparatus 1, which surface defines a microbend and two macrobends, one on each side of the microbend. The bend-imposing member 229 is thus similar to the second bend-imposing member 149 of FIG. 9A with the exception that the bend-imposing member 229 is shorter in length than the second bend-imposing member 149, and also defines no slot 163 like that of the second bend-imposing member 149. The middle portion of the linkage arm 224 is attached with screws to a slide member 230 of a ball slide 231. The slide member 230 slides in a mount 232 which is attached with screws (not shown) to the underside of a member 233. The member 233 is mounted with screws (not shown) to the upper sides of members 219, 220 so that the linkage arm 224 is suspended from the base 233. At its rear end, the base 233 has a dowel 234 extending toward the rear of the apparatus 1 when the base 233 is assembled in the apparatus 1. On the dowel 234, a coil spring 235 is fitted, and the dowel 234 with spring 235 are inserted in an aperture 236 (only one side of which can be seen in FIG. 17) extending along the longitudinal axis of the linkage arm 224 through one side of a block 237 at the rear of the linkage arm 224. On the opposite side of the block 237, a set screw 307 is threaded into the aperture 236. As so threaded, the end of the screw 307 abuts an end of the spring 235 inside of the block 237. The screw 307 can be used to adjust the spring pressure applied by the spring 235 against the linkage arm 224 and the base 233. Because the base 233 is fixed to the base 217 which in turn is fixed to the housing block 12, the spring 235 pushes against the screw 307 and hence the block 237 to urge the linkage arm 224 backwardly toward the rear of the apparatus 1 and hence against the pin 103 of the actuator arm assembly 17.

The front end of the base 233 defines on each of its sides collars 16 which hold the right and left photodetectors 129, 130 in the same manner as that shown and described with regard to the first embodiment of the apparatus 1 in FIGS. 9A and 9B. Between the right and left photodetectors 129, 130, the bend-imposing member 143 (which is the same shown and described with reference to FIGS. 9A and 9B) is positioned and held on its underside by members 240 extending from the front end of the base 233, and on its upper side by a clamp plate 241 mounted to the upper side of the base 233 with screws (not shown). When assembled, the bend-imposing member 143 with its microbend and macrobend surfaces oppose respective microbend and macrobend surfaces of the bend-imposing member 229 so that a microbend and macrobends can be imposed on an optical fiber disposed between the bend-imposing members 229, 143 when brought together into contact with the optical fiber from opposing sides.

On the upper side of the nose 4, the base 217 defines a recessed area which has a semicircular edge at its front end and parallel side edges terminating at edges 250 defining the forward edge of the slot 5 (see, e.g., FIG. 1). In the center of the semicircular edge at the front end of the recessed area 242, an aperture 243 is defined which extends along the front-rear axis of the base 217. A pin 244 has one end fixed in the aperture 243. Near the other end of the pin 244 opposite the fixed end, the pin 244 has an annular shoulder 245 which receives and holds one end of a spring 246. The other end of the spring 246 is fitted into an aperture 247 (not visible in FIG. 17) defined in the front end of a light shield 248 that the light shield 248 is urged toward the rear of the apparatus 1. The rear end of the light shield 248 slidably fits into the horizontal, upper portion of the T-shaped aperture 223 of the light wall 222. The underside of the light shield 248 in proximity to its rear end defines a slot 249 that receives the front end of the linkage arm 224. Near the middle of the light shield 248 on its underside, the slot 249 terminates to define a surface against which the front end of the linkage arm 224 pushes when the actuator 7 is pushed sufficiently forward toward the nose 4. The pushing forward of the light shield 248 by the linkage arm 224 causes the end of the light shield 248 to move out of contact with the light wall 222 in proximity to the horizontal portion of the T-shaped aperture 223 and forwardly of surfaces 250 which, together with the light wall 222, define the slot 5 of the second embodiment of the apparatus 1. When the actuator 7 is released and allowed to return to its neutral position, the spring 235 forces the actuator assembly 15 backwardly toward the rear of the apparatus 1 so that the front end of the linkage arm 224 moves backwardly until it is out of contact with the light shield 248. Due to the spring-loading of the light shield 248 by the spring 246, the rear end of the light shield 248 moves backwardly of the surfaces 250 and into contact with the light wall 222 to enclose the T-shaped aperture 223. In this position, the light wall 222 and the light shield 248 block ambient light from reaching the macrobend/microbend unit 3 so that optical fiber status determinations are not adversely affected by ambient light. The light wall 222 and the light shield 248 also prevent dust and the like from reaching the macrobend/microbend unit 3.

Figure 18:
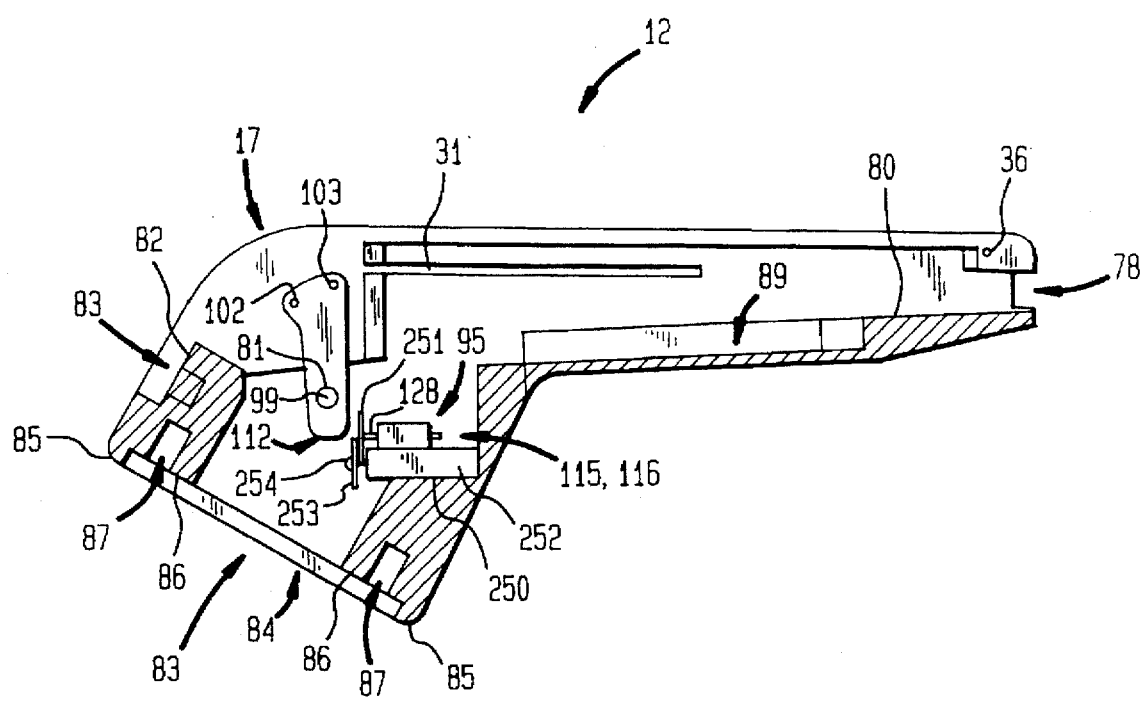
FIG. 18 is a cutaway side view of the housing block and a leaf spring and switch assembly in accordance with the second embodiment of the apparatus.

In the second embodiment of the apparatus 1 shown in FIG. 17, the spring and switch assembly 92 of the first embodiment of the apparatus 1 shown in FIGS. 8A and 8B, is not used. Instead, as shown in FIG. 18, a seat 250 of the housing block 12 (shown in FIG. 5E) is used to mount a leaf spring 251. More specifically, a block 252 is mounted to the seat 250 with screws (not shown), for example. One end of the leaf spring 251 is fixed between the end of the block 252 and a plate 253 with screws 254 inserted through holes defined in the plate 253 and the leaf spring 251 and threaded into the end of the block 252. The other unfixed end of the leaf spring 251 rests against the crosspiece 112 of the actuator arm assembly 17. Adjacent the leaf spring 251, the switch 95 is mounted so that its switch button 128 opposes the leaf spring 251. The terminals 115, 116 of the switch 95 are coupled between the battery and the circuit board(s) 41 as shown in FIG. 17.

When the actuator 7 is pulled backwardly, the actuator arm assembly 17 pivots about axle 99 so that the crosspiece 112 pushes the leaf spring 251 forwardly toward the front end of the housing block 12. The leaf spring 251 thus bears against the switch button 128 and depresses it to cause the terminals 115, 116 to be shorted together. On the other hand, when the actuator 7 is released, the leaf spring 251 returns to its unflexed position, thus releasing the switch button 128 and forcing the actuator arm assembly 17 to return to its neutral position.

In operation, the first embodiment of the apparatus 1 shown and described with reference to FIGS. 1–16B is gripped about the grip 8 in the palm of the operator's hand. In the absence of the application of any force to the actuator 7, the actuator assembly 15 will be in a neutral position at the equilibrium of the opposing forces of the spring assembly 96 urging the actuator assembly toward the nose 4, and the spring 159 which urges the actuator assembly 15 toward the rear of the apparatus 1 and thus away from the nose 4. In the neutral position of the apparatus 1, the first and second bend-imposing members 143, 149 are close together to reduce the possibility of dust or the like from falling therebetween, but not bearing against each other to reduce wear on the macrobend and microbend surfaces of the first and second bend-imposing members 143, 149.

The operator can perform a battery test of the apparatus 1 by pulling the actuator 7 backwardly toward the rear of the apparatus 1 with a thumb. If the apparatus 1 has battery power, the LED 29 will blink, and conversely, if the battery power is insufficient, the LED 29 will remain extinguished, thus indicating that a battery should be replaced or loaded into the apparatus 1. Also, the operator can perform a display test by pulling the actuator 7 backwardly and simultaneously depressing the display test button 10. If the display 6 and associated circuitry are properly operating, the LEDs 27, 28, 30 should be illuminated and the LED 29 should be blinking. If not, the display 6 or related circuitry is in need of repair or a battery is needed to power the apparatus 1.

In the load/unload mode of operation (or equivalently, the capture/release mode of operation), the operator can manipulate the nose 4 to slide an optical fiber on the upper side of the nose 4 to the slot 5 which guides the optical fiber to the macrobend/microbend unit 3. If the apparatus 1 is being used to determine optical fiber status in an optical fiber cable, the tapered shape of the nose 4 can be used to separate a desired optical fiber from among the many optical fibers in the cable. To position the optical fiber in the macrobend/ microbend unit 3 in the optical fiber load/unload mode of operation, the operator uses a thrust to push the actuator 7 toward the nose 4, causing the first and second bend-imposing members 143, 149 to separate relatively widely, thus allowing the optical fiber to be guided by the surfaces of the housing 2 defining the slot 5 into a position between the first and second bend-imposing members 143, 149. In the load/unload mode of operation, the spring assembly 96 is relatively uncompressed so that the switch 95 is open, and thus the circuitry on circuit board(s) 41 is not powered by the battery.

When the actuator 7 is released by the operator, the actuator assembly 15 returns to its neutral position with the first and second bend-imposing members 143, 149 loosely in contact with the optical fiber on opposing sides thereof. In this position, if desired, the operator can slide the optical fiber laterally between the bend-imposing members 143, 149.

To determine the status of the optical fiber in the status read mode of operation of the apparatus 1, the actuator 7 is pulled backwardly with the operator's thumb toward the rear of the apparatus 1, thus causing the actuator assembly 15 to separate from engagement with the second bend-imposing member 149. The second bend-imposing member 149, being no longer restrained by the actuator assembly 15, moves into tight engagement with the optical fiber under force applied by the spring 159. This action causes the first and second bend-imposing members 143, 149 to press against the optical fiber from opposing sides, thus imposing two macrobends and a microbend (that is situated between the two macrobends), onto the optical fiber. The pulling back of the actuator 7 also causes the spring assembly 96 to load and close the switch 95 to power the circuitry on circuit board(s) 41. If light is travelling to the right on the optical fiber relative to a perspective facing the rear of the apparatus 1, the right photodetector 129 generates a signal supplied to the circuit board(s) 41 for status determination, and if light is travelling to the left on the optical fiber, the left photodetector 130 generates a signal supplied to the circuit board(s) 41. Based on the signals from the right and left photodetectors 129, 130, the circuitry controls the display 6 to indicate whether light is travelling predominantly to the right or left on the optical fiber, and whether such light includes a tone signal of fixed frequency. Also, with the actuator 7 pulled backwardly, the display 6 should indicate whether battery power is sufficient or not by the presence or absence of blinking light from the LED 29. From a perspective facing the rear of the apparatus 1, if the apparatus 1 is positioned on the right side of a damaged area of an optical fiber cable and light is travelling to the right on the optical fiber, the optical fiber is not damaged by the damage to the cable. Similarly, if the apparatus 1 is positioned on the left side of a damaged area of an optical fiber cable and the apparatus 1 indicates that light is travelling to the left on the optical fiber cable, the optical fiber under analysis is not damaged by the damage to the cable. This capability of the apparatus 1 greatly reduces the number of tests that must be performed to determine and distinguish optical fibers that are damaged from those that are not so that the damaged fibers can be appropriately spliced to restore communications on the optical fiber cable.

When the operator releases the actuator 7, under force applied by the spring assembly 96, the actuator assembly 15 returns to its neutral position with the macrobend/microbend unit 3 loosely closing on the optical fiber. The spring assembly 96 thus releases the switch button 128 to open the switch 95 so that the circuit board(s) 41 are no longer powered by the battery to conserve battery power. To release the optical fiber from the apparatus 1, the operator pushes the actuator 7 forwardly to separate the first and second bend-imposing members 143, 149 from engagement with the optical fiber, and manipulates the apparatus 1 so that the optical fiber is guided out of the macrobend/microbend unit by the surfaces of the housing 2 defining the slot 5.

The operation of the second embodiment, whose portions that differ from corresponding portions of its first embodiment of the apparatus 1 are shown in FIGS. 17 and 18, is substantially similar to that of the embodiment of FIGS. 1–16B. The significant difference in operation between the two embodiments pertains to the functions of the light wall 222 and the light shield 248 in FIG. 17. Specifically, in the load/unload mode of operation of the embodiment of the apparatus 1 shown in and described with respect to FIGS. 17 and 18, the actuator assembly 15 moves forwardly toward the nose 4, causing the front end of the linkage arm 224 to push the light shield 248 forwardly, an action which loads the spring 246. In this position, an optical fiber can be positioned in the slot 5 between the light shield 248 and the bend-imposing member 229 on one side and the light wall 222 and the bend-imposing member 143 on its other side. When the actuator 7 is released by the operator, the spring 235 forces the actuator assembly 15 backwardly toward the rear of the apparatus 1. When so released, the actuator assembly 15 causes the bend-imposing member 229 to pull the optical fiber through the horizontal portion of T-shaped aperture 223 in the light wall 222, so that the optical fiber is loosely held between the bend-imposing members 143, 229. Also, in this position, the actuator assembly 15 moves toward the rear of the apparatus 1 and thus allows the spring 246 to push the light shield 248 against the light wall 222 so that no appreciable ambient light passes through the T-shaped aperture 223 in the light wall 222, and thus does not adversely affect determination of the optical fiber status. In both the load/unload and neutral positions, the leaf spring 251 of FIG. 18 is not significantly deflected by the actuator arm assembly 17 and thus the switch 95 is open so that the circuit board(s) 41 are not powered. In the status read mode of operation, the actuator 7 is pulled backwardly so that the actuator arm assembly 17 disengages from the coupler 225, thus allowing the spring 235 to force the bend-imposing members 143, 229 together against opposite sides of the optical fiber imposing the macrobends and microbend thereon. The pulling back of the actuator 7 also causes the crosspiece 112 of the actuator arm assembly 17 to engage with and deflect the leaf spring 251 which in turn closes the switch 95 to power the circuit board(s) 41 to perform status determination and indication via the display 6 in the manner described with respect to the operation of the first embodiment of the apparatus 1 shown in FIGS. 1–16B. When released, the actuator 7 returns to its neutral position under force applied by the leaf spring 251 as it returns to its unflexed position and releases the switch button 128 to open the switch 95. If the operator pushes the actuator 7 forwardly toward the nose 4 in the load/unload mode of operation, the actuator assembly 15 forces the bend-imposing members 143, 229 apart and the light shield 248 forwardly away from the light wall 222 so that the optical fiber can be released from the apparatus 1. Similarly to the first embodiment of the apparatus 1, the second embodiment of the apparatus 1 can be controlled by the operator to perform power and display tests of the apparatus 1. In the power test mode, the operator pulls back the actuator 7 as described above for the status read mode. If the apparatus 1 is powered and properly operating, the LED 30 will blink. Alternatively, if the LED 30 does not blink, the apparatus 1 is in need of a battery or repair. In the display test mode, the operator pulls back the actuator 7 and simultaneously depresses the display test button 10. If the apparatus 1 is properly operating, the LEDs 27, 28, 29 should be illuminated and the LED 30 should be blinking. Otherwise, the apparatus 1 is either in need of a battery or repair.

Although the invention has been described with specific illustrations and embodiments, it will be clear to those of ordinary skill in the art that various modifications may be made therein without departing from the scope of the invention as outlined in the following claims. For example, the housing 2 serving mainly to support and protect the macrobend/microbend unit 3 and the actuator assembly 15, can be configured differently without departing from the scope of the invention. Also, the actuator assembly 15 can be configured in a variety of forms, the important purpose of the actuator assembly being to allow an operator to cause the macrobend/microbend unit 3 to open or close between load/unload and status read modes of operation, and preferably also to selectively power the circuit board(s) 41 in the status read or display and power test modes of operation. Moreover, if desired, the circuitry can be modified in a variety of ways without departing from the scope of the invention, including the omission of the comparator 198, NAND gates 201, 203 and inverter 204, by coupling the outputs of comparators 199, 200 to inputs of respective inverters whose outputs are coupled to respective diodes 202, 205, and by providing a switch to control the selection of one of the two inputs to the multiplexer 206. This modification allows the apparatus 1 to be readily used with optical fibers individually carrying two-way traffic. The above-described and other modifications or equivalents of this invention are intended to be included within the scope of this invention as outlined in the following claims.

We claim:

1. An apparatus for analyzing the status of an optical fiber, the apparatus comprising:

a macrobend/microbend unit for imposing two macrobends on the optical fiber, and a microbend on the optical fiber between the two macrobends;

first and second photodetectors arranged in a proximity to respective macrobends for generating respective signals based on light received from respective macrobends;

means for determining the necessity of splicing the optical fiber based upon the signals received from said photodetectors, said means comprising a circuit arrangement for determining the direction of light propagating in the optical fiber based on at least one of the signals; and a display coupled to said means for indicating the direction of light propagating in the optical fiber wherein said circuit arrangement comprises a comparator unit coupled between the first and second photodetectors, and the display, for performing a first comparison between the signal from the first photodetector and a first predetermined voltage, and generating a first signal to control the display to indicate whether or not light is propagating in the optical fiber in a first direction, based on the first comparison, and for performing a second comparison between the signal from the second photodetector and a second predetermined voltage, and generating a second signal to control the display to indicate whether light is propagating in the optical fiber in a second direction opposite to the first direction, based on the second comparison.

2. An apparatus as claimed in claim 1, further comprising:

first and second amplifier units coupled between the first and second photodetectors, respectively, and the comparator unit, for amplifying respective signals from the first and second photodetectors, and outputting the amplified signals to the comparator unit to perform the first and second comparisons with the first and second predetermined voltages, respectively.

3. An apparatus as claimed in claim 2, wherein the first and second amplifier units amplify respective signals from the first and second photodetectors, based on respective levels of the signals from the first and second photodetectors.

4. An apparatus as claimed in claim 3, wherein the comparator unit performs a third comparison between the signals from the first and second photodetectors, and generates an output signal based on the third comparison, the apparatus further comprising:

a multiplexer having input terminals coupled to receive respective signals from the first and second amplifier units, and having a select input coupled to receive the output signal from the comparator unit, the multiplexer outputting one of the signals from the first and second amplifier units, based on the output signal from the comparator unit;

a band-pass filter and rectifier unit coupled to receive the output of the multiplexer unit, for band-pass filtering and rectifying one of the signals from the first and second photodetectors output from the multiplexer, to generate an output signal; and a comparator coupled between the display and band-pass filter and rectifier unit, for performing a fourth comparison between the level of the output signal from the band-pass filter and rectifier unit, and a predetermined voltage, and generating an output signal based on the fourth comparison, the display indicating the presence or absence of a tone signal in the one of the signals from the first and second photodetectors selected by the multiplexer, based on the output signal from the comparator.

5. An apparatus as claimed in claim 1, wherein the display indicates whether the optical fiber is live or dead, based on at least one of the signals.

6. An apparatus as claimed in claim 1, wherein the display indicates whether a live optical fiber carries a tone signal, based on at least one of the first and second signals.

7. An apparatus as claimed in claim 1, wherein the macrobend/microbend unit includes first and second bend-imposing members, and the apparatus is used by an operator, the apparatus further comprising:

an actuator assembly having an end coupled to the second bend-imposing member and an actuator which the operator can move at least between first and second positions, the first position forcing the first and second bend-imposing members apart to receive or release the optical fiber, and the second position forcing the first and second bend-imposing members together to impose the macrobends and microbends on the optical fiber.

8. An apparatus as claimed in claim 7, further comprising a housing for substantially enclosing and supporting the macrobend/microbend unit, the first and second photodetectors, the spring member and the actuator assembly.

9. An apparatus as claimed in claim 8, wherein the display is positioned on a top side of the housing.

10. An apparatus as claimed in claim 8, wherein the housing defines a slot for guiding the optical fiber into or out of a position between the first and second bend-imposing members.

11. An apparatus as claimed in claim 8, wherein the optical fiber is included in an optical fiber cable having a plurality of optical fibers, and wherein the housing has a nose with a tapered tip which can be used by the operator to separate a selected optical fiber from other optical fibers in the cable, to feed the selected optical fiber to the macrobend/microbend unit.

12. An apparatus as claimed in claim 7, further comprising:

a light wall mounted to the housing, and defining an aperture through which the second bend-imposing member moves between the first and second positions of the actuator;

a spring coupled at a first end to the housing; and a light shield coupled to a second end of the spring, and urged toward the light wall by the spring, the actuator assembly forcing the light shield apart from the light wall in the first position of the actuator, and the actuator assembly allowing the spring to urge the light shield against the light wall in the second position of the actuator so that ambient light is substantially prevented by the light shield from reaching the macrobend/microbend unit.

13. An apparatus for analyzing the status of an optical fiber, the apparatus comprising:

a macrobend/microbend unit for imposing two macrobends on the optical fiber, and a microbend on the optical fiber between the two macrobends;

first and second photodetectors arranged in proximity to respective microbends, and generating respective signals based on light received from respective macrobends;

a display coupled to the first and second photodetectors, indicating the direction of light propagating on the optical fiber, based on at least one of the signals;

a comparator unit coupled between the first and second photodetectors and the display for performing a first comparison between the signal from the first photodetector and a first predetermined voltage, and generating a first signal to control the display to indicate whether or not light is propagating in the optical fiber in a first direction, based on the first comparison, and for performing a second comparison between the signal from the second photodetector and a second predetermined voltage, and generating a second signal to control the display to indicate whether light is propagating in the optical fiber in a second direction opposite to the first direction, based on the second comparison.

14. An apparatus as claimed in claim 13, further comprising:

first and second amplifier units coupled between the first and second photodetectors, respectively, and the comparator unit, for amplifying respective signals from the first and second photodetectors, and outputting the amplified signals to the comparator unit to perform the first and second comparisons with the first and second predetermined voltages, respectively.

15. An apparatus as claimed in claim 14, wherein the first and second amplifier units amplify respective signals from the first and second photodetectors, based on respective levels of signals from the first and second photodetectors.

16. An apparatus as claimed in claim 14, where in the comparator unit performs a third comparison between the signals from the first and second photodetectors, and generates an output signal based on the third comparison, the apparatus further comprising:

a multiplexer having input terminals coupled to receive respective signals from the first and second amplifier units, and having a select input coupled to receive the output signal from the comparator unit, the multiplexer outputting one of the signals from the first and second amplifier units, based on the output signal from the comparator unit;

a band-pass filter and rectifier unit coupled to receive the output of the multiplexer unit, for band-pass filtering and rectifying one of the signals from the first and second photodetectors output from the multiplexer, to generate an output signal; and a comparator coupled between the display and band-pass filter and rectifier unit, for performing a fourth comparison between the level of the output signal from the band-pass filter and rectifier unit and a predetermined voltage, and generating an output signal based on the fourth comparison, the display indicating the presence of a tone signal in the once of the signals from the first and second photodetectors selected by the multiplexer, based on the output signal from the comparator.

17. An apparatus for analyzing the status of an optical fiber, the apparatus comprising:

a macrobend/microbend unit for imposing two macrobends on the optical fiber, and a microbend on the optical fiber between the two macrobends;

first and second photodetectors arranged in proximity to respective macrobends, and generating respective signals based on light received from respective macrobends;

a display coupled to the first and second photodetectors indicating the direction of light propagating in the optical fiber, based on at least one of the signals;

said macrobend/microbend unit including first and second bend imposing members with the apparatus to be used by an operator, said apparatus further comprising:

an actuator assembly having an end coupled to the second bend-imposing member and an actuator which the operator can move at least between first and second positions, the first position forcing the first and second bend-imposing members apart to receive or release the optical fiber, and the second position forcing the first and second bend-imposing members together to impose the macrobends and microbends on the optical fiber;

a housing for substantially enclosing and supporting the macrobend/microbend unit, the first and second photodetectors, the spring member, and the actuator assembly, said housing having a grip attached thereto to provide a handlehold for the operator;

a battery;

a switch means mounted in the housing and coupled to the actuator assembly, the switch being open in the first position of the actuator and closed in the second position of the actuator;

at least one circuit board housed in the grip and coupled to the first and second photodetectors, the switch, and the display unit, the circuit board including:

a first comparator generating, if the switch is closed to supply power from the battery to the first comparator, a first display signal supplied to the display unit based on the signal from the first photodetector, the display unit indicating whether or not light is propagating in a first direction in the optical fiber, based on the first display signal; and a second comparator generating, if the switch is closed to supply power from the battery to the second comparator, a second display signal supplied to the display unit, based on the signal from the second photodetector, the display unit indicating whether or not light is propagating in a second direction opposite to the first direction in the optical fiber, based on the second display signal.

18. An apparatus as claimed in claim 17, wherein the circuit board has first and second pairs of wires with respective ends coupled to the circuit board, the first pair of wires terminated by a battery terminal, the apparatus further comprising:

a battery case including
 a first part mounted to an end of the grip opposite the housing, the first part having a U-shaped member for holding the battery, and defining an aperture through which run the first and second pairs of wires, the terminal of the first pair of wires being coupled to the battery,
 a second part joinable with the first part to enclose the battery,
 a button for testing the power of the battery, the button being housed in the second part and coupled to the circuit board with the second pair of wires, and
 a captured screw mounted in the second part, for holding the second part to the first part when screwed into an aperture defined in the first part,
the second pair of wires preventing the second part from separating from the apparatus when the captured screw is unscrewed from the first part.

19. An apparatus as claimed in claim 18, wherein the first part has a pair of flanges, and the second part defines two ledges and tracks adjacent respective ledges, and wherein, when the first and second parts of the battery case are joined together, the flanges are situated in respective tracks and flexed toward one another so that the flanges are confined in respective tracks by respective ledges.

20. An apparatus as claimed in claim 17, further comprising:

a spring coupled between the housing and the second bend-imposing member, for urging the second bend-imposing member toward the first bend-imposing member; and a spring assembly coupled between the housing and the actuator assembly, the spring assembly urging the actuator assembly in a direction opposite to the spring to define a third position of the actuator between the first and second positions, in which the first and second bend-imposing members are relatively close together and the switch is opened so that no power is supplied to the first and second comparators housed in the circuit board.

21. An apparatus as claimed in claim 17, further comprising:

a spring coupled between the housing and the actuator assembly, for urging the first and second bend-imposing members together; and a leaf spring mounted to the housing and arranged in proximity to an actuator arm assembly of the actuator assembly, and the switch, the leaf spring being flexed in opposition to the spring to define a third position of the actuator between the first and second positions in which the switch is open, the leaf spring being relatively unflexed in the first position of the actuator so that the switch is open, and the leaf spring being relatively flexed and deflected in the second position of the actuator so that the leaf spring bears against and closes the switch.

22. A method for determining the necessity of splicing an optical fiber comprising the steps of:

a) imposing a first macrobend and a microbend on an optical fiber;

b) determining if light is being emitted from the first macrobend through a first photodetector arranged in a proximity to the first macrobend and generating a first signal based thereon;

c) performing a first comparison between the first signal from the first photodetector and a first predetermined voltage, and generating a signal to control a display to indicate whether or not light is propagating in the optical fiber in a first direction, based on the first comparison;

d) imposing a second macrobend on the optical fiber so that the microbend is between the first and second macrobends;

e) determining if light is being emitted from the second macrobend through a second photodetector arranged in a proximity to the second macrobend and generating a second signal based thereon; and f) performing a second comparison between the second signal from the second photodetector and a second predetermined voltage, and generating a second signal to control the display to indicate whether light is propagating in the optical fiber in a second direction opposite to the first direction, based on the second comparison.

23. A method as claimed in claim 22, further comprising the step of:

g) determining that the optical fiber is dead if the display indicates that light is not propagating in either of the first and second directions.

24. A method as claimed in claim 22, wherein the optical fiber is included in an optical fiber cable containing a plurality of optical fibers, and wherein said steps (a)–(c) are performed on the optical fiber at a location situated downstream relative to the first direction from a damaged portion of the optical fiber cable, the method further comprising the step of:

d) determining that the optical fiber is not damaged at the damaged portion of the optical fiber cable if the display indicates that light is travelling in the first direction on the optical fiber.

25. A method as claimed in claim 22 and further including the step of determining if light is traveling away from a damaged portion, based upon the indicated direction in the display.

* * * * *